United States Patent
Zheng et al.

(10) Patent No.: US 8,619,676 B2
(45) Date of Patent: Dec. 31, 2013

(54) LEGACY CYCLIC SHIFT DELAY (CSD) FOR ORTHOGONAL FREQUENCY DIVISION MULTIPLEXING (OFDM) SIGNALING WITHIN MULTIPLE USER, MULTIPLE ACCESS, AND/OR MIMO WIRELESS COMMUNICATIONS

(75) Inventors: Jun Zheng, San Diego, CA (US); Vinko Erceg, Cardiff by the Sea, CA (US)

(73) Assignee: Broadcom Corporation, Irvine, CA (US)

( * ) Notice: Subject to any disclaimer, the term of this patent is extended or adjusted under 35 U.S.C. 154(b) by 265 days.

(21) Appl. No.: 13/073,775

(22) Filed: Mar. 28, 2011

(65) Prior Publication Data
US 2011/0305194 A1    Dec. 15, 2011

Related U.S. Application Data

(60) Provisional application No. 61/353,184, filed on Jun. 9, 2010, provisional application No. 61/357,936, filed on Jun. 23, 2010, provisional application No. 61/387,930, filed on Sep. 29, 2010, provisional application No. 61/390,295, filed on Oct. 6, 2010.

(51) Int. Cl.
H04W 4/00    (2009.01)

(52) U.S. Cl.
USPC ............................ 370/328; 370/311; 370/345

(58) Field of Classification Search
USPC .......................................... 370/328, 311, 345
See application file for complete search history.

(56) References Cited

U.S. PATENT DOCUMENTS

| | | | | |
|---|---|---|---|---|
| 2003/0189514 | A1* | 10/2003 | Miyano et al. | 342/372 |
| 2006/0088120 | A1* | 4/2006 | Hansen et al. | 375/267 |
| 2007/0008946 | A1* | 1/2007 | Kim | 370/345 |
| 2007/0097946 | A1 | 5/2007 | Mujtaba | |
| 2010/0046656 | A1* | 2/2010 | van Nee et al. | 375/267 |

FOREIGN PATENT DOCUMENTS

| | | |
|---|---|---|
| WO | 2010021900 A2 | 2/2010 |
| WO | 2011006108 A2 | 1/2011 |

OTHER PUBLICATIONS

European Search Report for EP Application No./Patent No. 11004382.5-1246, dated Sep. 27, 2011, 3 pages.

* cited by examiner

*Primary Examiner* — Robert Wilson
*Assistant Examiner* — Pamit Kaur
(74) *Attorney, Agent, or Firm* — Garlick & Markison; Kevin L. Smith

(57) ABSTRACT

Legacy cyclic shift delay (CSD) for use within multiple user, multiple access, and/or MIMO wireless communications. Appropriately designed CSD is applied to communications in wireless communication systems thereby ensuring a minimized power error difference between respective portions of a packet transmitted therein. Such respective portions of the packet may be portions of the packet's preamble. For example, the first and second portions may be a legacy short training field (L-STF) and a very high throughput short training field (VHT-STF). By applying such appropriately designed CSD to a packet, a wireless communication device receiving a signal corresponding to that packet need not perform extra or very significant backoff (e.g., with respect to a signal subsequent to automatic gain control (AGC) processing) thereby simplifying signal processing and potentially also reducing a total number of effective analog to digital converter (ADC) bits needed to represent a digitally sampled version of that signal.

24 Claims, 28 Drawing Sheets

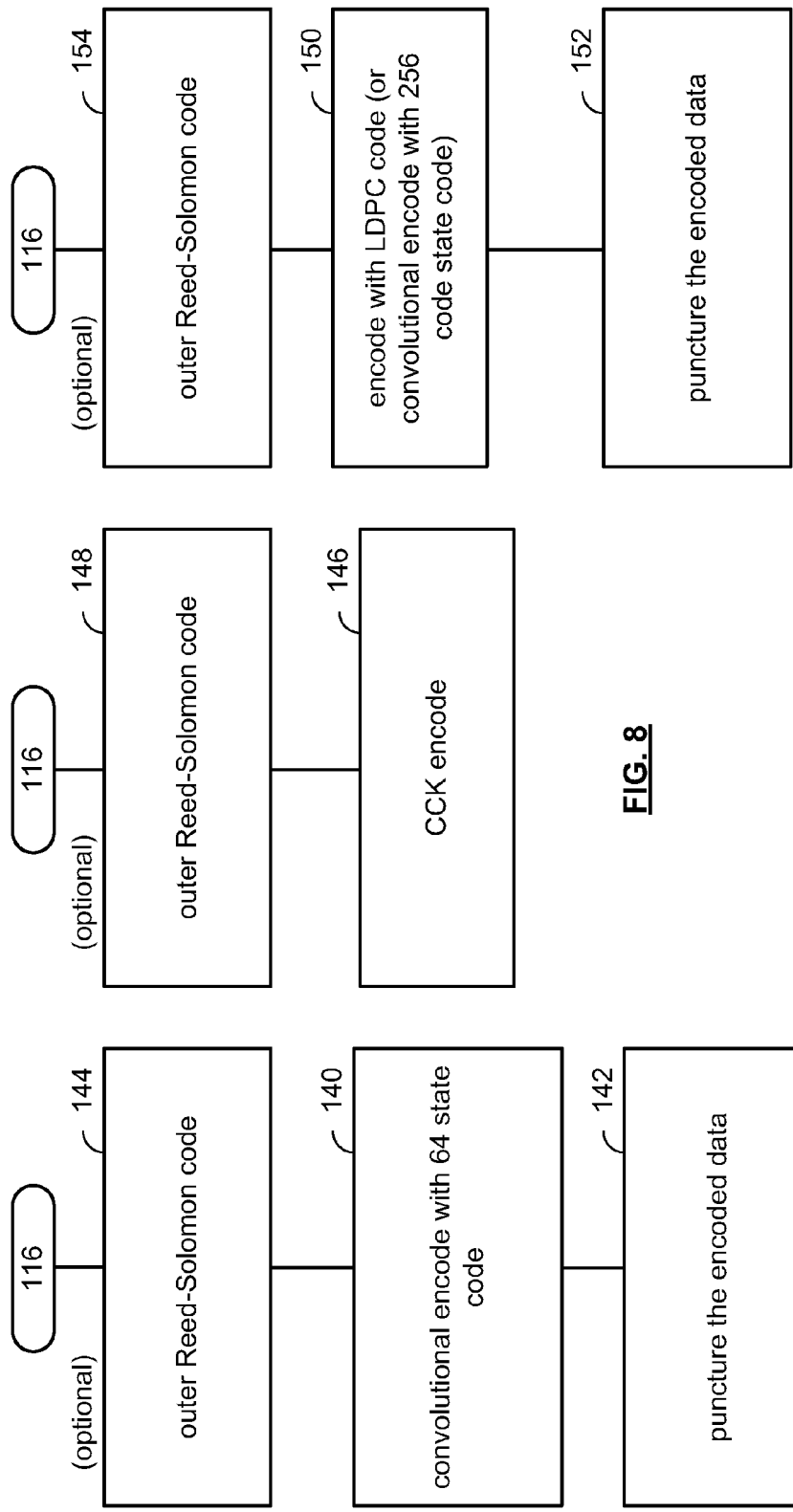

| NTX (1, 2, 3, and 4) | CSD values | | | | 20 MHz (11nB/C/D/E) 95% of power difference between L-STF & VHT-STF | 40 MHz (11nB/C/D/E) 95% of power difference between L-STF & VHT-STF |
|---|---|---|---|---|---|---|
| 1 | 0 | | | | 0 dB | 0 dB |
| 2 | 0 | −200 | | | 2.0 dB | 1.4 dB |
| 3 | 0 | −100 | −200 | | 2.3 dB | 1.7 dB |
| 4 | 0 | −50 | −100 | −150 | 3.3 dB | 2.0 dB |

| NTX | CSD values | 20 MHz (11nB/C/D/E) 95% of power difference between L-STF & VHT-STF | 40 MHz (11nB/C/D/E) 95% of power difference between L-STF & VHT-STF |
|---|---|---|---|
| 5 | 0 −200 −100 −25 −150 | 3.1 dB | 1.7 dB |
| 5 | 0 −75 −125 −200 −25 | 3.2 dB | 1.6 dB |
| 5 | 0 −75 −200 −150 −25 | 3.2 dB | 1.7 dB |
| 5 | 0 −150 −200 −25 −100 | 3.5 dB | 1.4 dB |
| 5 | 0 −150 −200 −50 −100 | 3.6 dB | 1.3 dB |
| 5 | 0 −75 −200 −125 −25 | 3.2 dB | 1.8 dB |
| 5 | 0 −100 −150 −200 −50 | 3.4 dB | 1.7 dB |
| 5 | 0 −200 −100 −25 −175 | 3.0 dB | 2.1 dB |

| NTX | CSD values | 20 MHz (11nB/C/D/E) 95% of power difference between L-STF & VHT-STF | 40 MHz (11nB/C/D/E) 95% of power difference between L-STF & VHT-STF |
|---|---|---|---|
| 6 | 0 −200 −100 −25 −150 −75 | 3.3 dB | 1.7 dB |
| 6 | 0 −125 −200 −25 −175 −75 | 3.3 dB | 1.8 dB |
| 6 | 0 −75 −200 −125 −25 −175 | 3.4 dB | 1.8 dB |
| 6 | 0 −100 −200 −125 −50 −175 | 3.4 dB | 1.8 dB |
| 6 | 0 −200 −125 −50 −175 −100 | 3.5 dB | 1.8 dB |
| 6 | 0 −125 −200 −25 −100 −175 | 3.4 dB | 1.9 dB |
| 6 | 0 −175 −200 −25 −125 −75 | 3.8 dB | 1.5 dB |
| 6 | 0 −75 −125 −150 −25 −200 | 3.8 dB | 1.5 dB |

$$T_{CSD} = \begin{bmatrix} 0 & 0 & 0 & 0 & 0 & 0 & 0 & 0 \\ 0 & -200 & 0 & 0 & 0 & 0 & 0 & 0 \\ 0 & -100 & -200 & 0 & 0 & 0 & 0 & 0 \\ 0 & -50 & -100 & -150 & 0 & 0 & 0 & 0 \\ 0 & -200 & -100 & -25 & -150 & 0 & 0 & 0 \\ 0 & -200 & -100 & -25 & -150 & -75 & 0 & 0 \\ 0 & -200 & -100 & -25 & -150 & -75 & -50 & 0 \\ 0 & -200 & -100 & -25 & -150 & -75 & -50 & -175 \end{bmatrix}$$ (in units of *ns*)

(IEEE 802.11n legacy CSD table — upper-left 4×4 block)

commonality among NTX=5, 6, 7, 8

FIG. 21A

$$T_{CSD} = \begin{bmatrix} 0 & 0 & 0 & 0 & 0 & 0 & 0 & 0 \\ 0 & -200 & 0 & 0 & 0 & 0 & 0 & 0 \\ 0 & -100 & -200 & 0 & 0 & 0 & 0 & 0 \\ 0 & -50 & -100 & -150 & 0 & 0 & 0 & 0 \\ 0 & -200 & -100 & -25 & -150 & 0 & 0 & 0 \\ 0 & -200 & -125 & -25 & -150 & -75 & 0 & 0 \\ 0 & -75 & -200 & -25 & -25 & -175 & -100 & 0 \\ 0 & -200 & -100 & -25 & -150 & -75 & -50 & -175 \end{bmatrix}$$ (in units of *ns*)

(IEEE 802.11n legacy CSD table — upper-left 4×4 block)

best NTX=7

FIG. 21B

| NTX (1, 2, 3, and 4) | CSD values | | | | 95% of AGC error of legacy preamble channel model: 11nB/C/D/E | | | 95% of power difference between L-STF & VHT-STF channel model: 11nB/C/D/E | | |
|---|---|---|---|---|---|---|---|---|---|---|
| | | | | | 20 MHz | 40 MHz | 80 MHz | 20 MHz | 40 MHz | 80 MHz |
| 1 | 0 | | | | 0.9 dB | 0.6 dB | 0.5 dB | 0 dB | 0 dB | 0 dB |
| 2 | 0 | -200 | | | 1.5 dB | 1.1 dB | 0.9 dB | 2.6 dB | 1.7 dB | 1.5 dB |
| 3 | 0 | -100 | -200 | | 2.0 dB | 1.4 dB | 1.1 dB | 3.7 dB | 3.0 dB | 2.5 dB |
| 4 | 0 | -50 | -100 | -150 | 2.0 dB | 0.9 dB | 0.8 dB | 3.8 dB | 2.9 dB | 2.5 dB |

$$T_{CSD} = \begin{bmatrix} 0 & 0 & 0 & 0 & 0 & 0 & 0 & 0 \\ 0 & -200 & 0 & 0 & 0 & 0 & 0 & 0 \\ 0 & -100 & -200 & 0 & 0 & 0 & 0 & 0 \\ 0 & -50 & -100 & -150 & 0 & 0 & 0 & 0 \\ 0 & -175 & -25 & -50 & -75 & 0 & 0 & 0 \\ 0 & -200 & -25 & -150 & -175 & 0 & 0 & 0 \\ 0 & -200 & -150 & -25 & -175 & -125 & 0 & 0 \\ 0 & -175 & -150 & -150 & -25 & -75 & -50 & 0 \\ 0 & -175 & -150 & -150 & -25 & -100 & -50 & -200 \end{bmatrix}$$ (in units of *ns*)

IEEE 802.11n legacy CSD table

FIG. 25

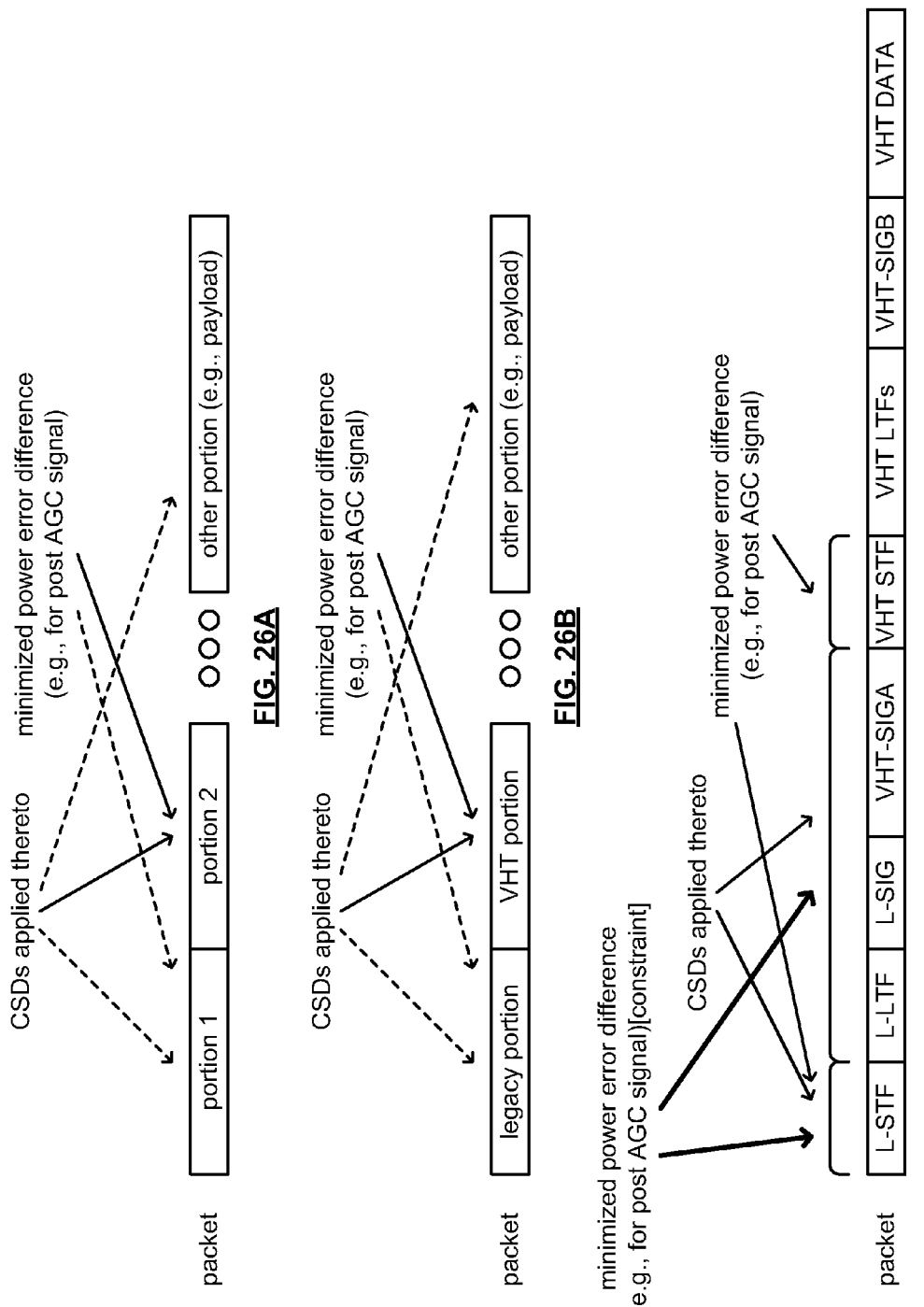

2700 within a baseband processing module of a wireless communication device generating a packet in accordance with a plurality of CSDs, each of the plurality of CSDs being a respective integer multiple of a time period, for minimizing difference between a first power associated with a first portion of the packet and a second power associated with a second portion of the packet 2710 via a plurality of antennae, transmitting a signal including the packet to a plurality of wireless communication devices such that each of the plurality of antennae transmitting at a respective time in accordance a respective one of the plurality of CSDs 2720

FIG. 27A

2701 within a baseband processing module of a wireless communication device generating a multi-user packet including a first portion being compliant in accordance with a first communication protocol and a second portion being compliant in accordance with a second communication protocol in accordance with a plurality of CSDs, each of the plurality of CSDs being a respective integer multiple of a time period, for minimizing difference between a first power associated with the first portion and the second power associated with the second portion 2711 first portion (L-STF) and second portion (VHT-STF) 2711a via a plurality of antennae, transmitting a signal including the multi-user packet to a plurality of wireless communication devices such that each of the plurality of antennae transmitting at a respective time in accordance a respective one of the plurality of CSDs 2721

FIG. 27B

LEGACY CYCLIC SHIFT DELAY (CSD) FOR ORTHOGONAL FREQUENCY DIVISION MULTIPLEXING (OFDM) SIGNALING WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:

1. U.S. Provisional Application Ser. No. 61/353,184, entitled "Cyclic shift delay (CSD) short training field (STF) for use within multiple user, multiple access, and/or MIMO wireless communications," pending.
2. U.S. Provisional Application Ser. No. 61/357,936, entitled "Cyclic shift delay (CSD) short training field (STF) for use within multiple user, multiple access, and/or MIMO wireless communications," filed Jun. 23, 2010, pending now expired.
3. U.S. Provisional Application Ser. No. 61/387,930, entitled "Legacy cyclic shift delay (CSD) for use within multiple user, multiple access, and/or MIMO wireless communications," filed Sep. 29, 2010, pending now expired.
4. U.S. Provisional Application Ser. No. 61/390,295, entitled "Legacy cyclic shift delay (CSD) for use within multiple user, multiple access, and/or MIMO wireless communications," filed Oct. 2, 010, pending now expired.

INCORPORATION BY REFERENCE

The following U.S. Utility patent application is hereby incorporated herein by reference in its entirety and is made part of the present U.S. Utility patent application for all purposes:

1. U.S. Utility patent application Ser. No. 13/073,716, entitled "Cyclic shift delay (CSD) short training field (STF) for use within multiple user, multiple access, and/or MIMO wireless communications," filed concurrently on Mar. 28, 2011, pending.

The following U.S. Utility patent application is hereby incorporated herein by reference in its entirety and is made part of the present U.S. Utility patent application for all purposes:

1. U.S. Utility patent application Ser. No. 12/796,655, entitled "Group identification and definition within multiple user, multiple access, and/or MIMO wireless communications," filed on Jun. 8, 2010, pending, which claims priority pursuant to 35 U.S.C. §119(e) to the following U.S. Provisional patent applications which are hereby incorporated herein by reference in their entirety and made part of the present U.S. Utility patent application for all purposes:
   1.1. U.S. Provisional Application Ser. No. 61/185,153, entitled "OFDMA cluster parsing and acknowledgement to OFDMA/MU-MIMO transmissions in WLAN device," filed Jun. 8, 2009, now expired.
   1.2. U.S. Provisional Application Ser. No. 61/185,161, entitled "WLAN Multi-user/OFDM multiple access training," filed Jun. 8, 2009, now expired.
   1.3. U.S. Provisional Application Ser. No. 61/186,119, entitled "WLAN Multi-user/OFDM multiple access training," filed Jun. 11, 2009, now expired.
   1.4. U.S. Provisional Application Ser. No. 61/311,480, entitled "Next generation WLAN backwards compatible sounding frame," filed Mar. 8, 2010, now expired.
   1.5. U.S. Provisional Application Ser. No. 61/250,491, entitled "Multi-user multiple input multiple output preamble," filed Oct. 9, 2009, now expired.
   1.6. U.S. Provisional Application Ser. No. 61/255,690, entitled "Multi-user multiple input multiple output preamble," filed Oct. 28, 2009, now expired.
   1.7. U.S. Provisional Application Ser. No. 61/257,323, entitled "Multi-user multiple input multiple output preamble," filed Nov. 2, 2009, now expired.
   1.8. U.S. Provisional Application Ser. No. 61/321,430, entitled "Multi-user multiple input multiple output preamble," filed Apr. 6, 2010, pending now expired.
   1.9. U.S. Provisional Application Ser. No. 61/232,316, entitled "WLAN next generation PHY header options," filed Aug. 7, 2009, now expired.
   1.10. U.S. Provisional Application Ser. No. 61/240,285, entitled "WLAN next generation PHY header options," filed Sep. 7, 2009, now expired.
   1.11. U.S. Provisional Application Ser. No. 61/250,531, entitled "WLAN next generation PHY header options," filed Oct. 11, 2009, now expired.
   1.12. U.S. Provisional Application Ser. No. 61/255,232, entitled "WLAN next generation PHY header options," filed Nov. 27, 2009, now expired.
   1.13. U.S. Provisional Application Ser. No. 61/319,366, entitled "Efficient group ID for MU-MIMO transmissions in next generation WLAN," filed Mar. 31, 2010, pending now expired.

The U.S. Utility patent application Ser. No. 12/796,655 also claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

1. U.S. Utility patent application Ser. No. 12/794,707, entitled "Cluster parsing for signaling within multiple user, multiple access, and/or MIMO wireless communications," filed on Jun. 4, 2010, pending, which claims priority pursuant to 35 U.S.C. §119(e) to the following U.S. Provisional patent applications which are hereby incorporated herein by reference in their entirety and made part of the present U.S. Utility patent application for all purposes:
   a. U.S. Provisional Application Ser. No. 61/184,420, entitled "OFDMA cluster parsing and acknowledgement to OFDMA/MU-MIMO transmissions in WLAN device," filed Jun. 5, 2009, now expired.
   b. U.S. Provisional Application Ser. No. 61/185,153, entitled "OFDMA cluster parsing and acknowledgement to OFDMA/MU-MIMO transmissions in WLAN device," filed Jun. 8, 2009, now expired.

The U.S. Utility patent application Ser. No. 12/796,655 also claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

2. U.S. Utility patent application Ser. No. 12/794,711, entitled "Transmission acknowledgement within multiple user, multiple access, and/or MIMO wireless communications," filed on Jun. 4, 2010, pending, which claims priority pursuant to 35 U.S.C. §119(e) to the following U.S. Provisional patent applications which are hereby incorporated herein by reference in their entirety and made part of the present U.S. Utility patent application for all purposes:

a. U.S. Provisional Application Ser. No. 61/184,420, entitled "OFDMA cluster parsing and acknowledgement to OFDMA/MU-MIMO transmissions in WLAN device," filed Jun. 5, 2009, now expired.

b. U.S. Provisional Application Ser. No. 61/185,153, entitled "OFDMA cluster parsing and acknowledgement to OFDMA/MU-MIMO transmissions in WLAN device," filed Jun. 8, 2009, now expired.

INCORPORATION BY REFERENCE

The following IEEE standards are hereby incorporated herein by reference in their entirety and are made part of the present U.S. Utility patent application for all purposes:

1. IEEE Std 802.11™-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 pages.

BACKGROUND OF THE INVENTION

1. Technical Field of the Invention

The invention relates generally to communication systems; and, more particularly, it relates to multi-antenna cyclic shift delay (CSD) within multiple user, multiple access, and/or MIMO wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIGS. 7-9 are diagrams illustrating various embodiments for encoding the scrambled data.

FIG. 21A is a diagram illustrating an embodiment of an optimal legacy CSD table that may be employed for communication devices employing anywhere from one (1) to eight (8) antennae and operating in accordance with a communication protocol (e.g., IEEE 802.11x where x is a, b, g, n; IEEE 802.11ac; etc.).

FIG. 21B is a diagram illustrating an alternative embodiment of an optimal legacy CSD table that may be employed for communication devices employing anywhere from one (1) to eight (8) antennae and operating in accordance with a communication protocol (e.g., IEEE 802.11x where x is a, b, g, n; IEEE 802.11ac; etc.).

FIG. 25 is a diagram illustrating an alternative embodiment of an optimal legacy CSD table that may be employed for communication devices employing anywhere from one (1) to eight (8) antennae and operating in accordance with a communication protocol (e.g., IEEE 802.11x where x is a, b, g, n; IEEE 802.11ac; etc.).

FIG. 26A, FIG. 26B, and FIG. 26C are diagrams illustrating various embodiments of applying CSDs to respective portions of a packet thereby minimizing power error differences between various portions thereof.

FIG. 27A, FIG. 27B, FIG. 28A, and FIG. 28B illustrate various embodiments of methods for operating wireless communication devices.

DETAILED DESCRIPTION OF THE INVENTION

Figure 1:
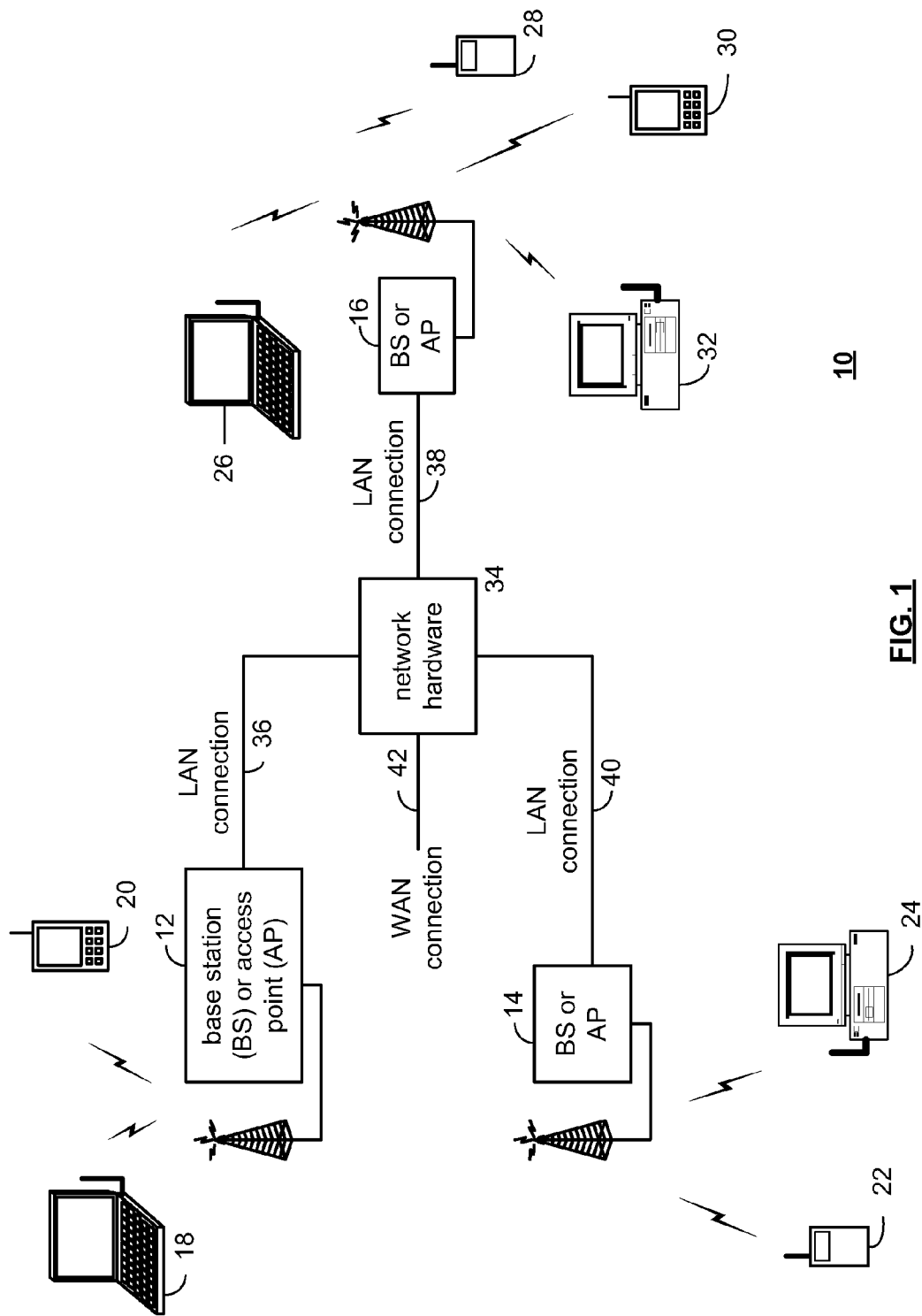
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
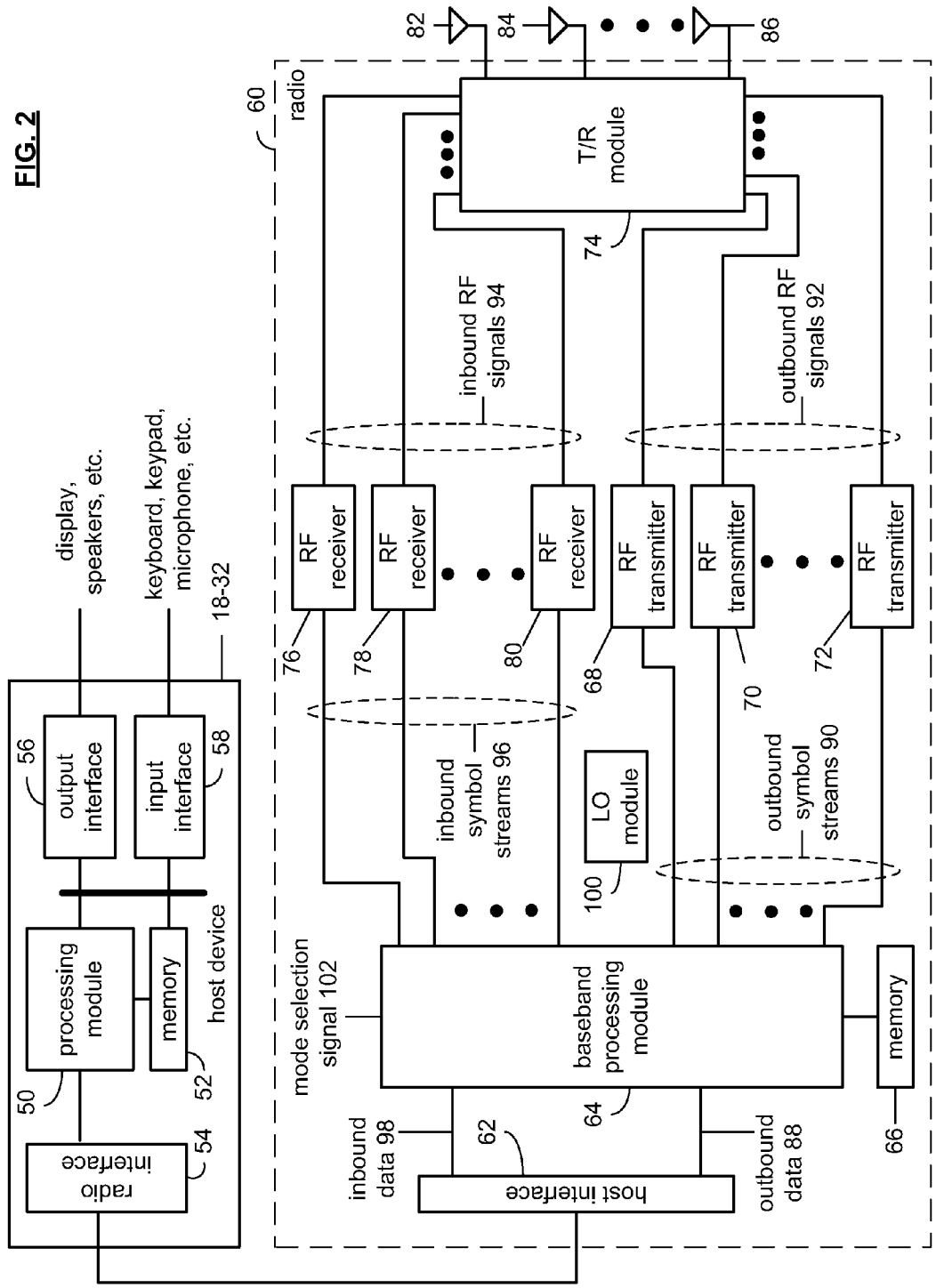
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
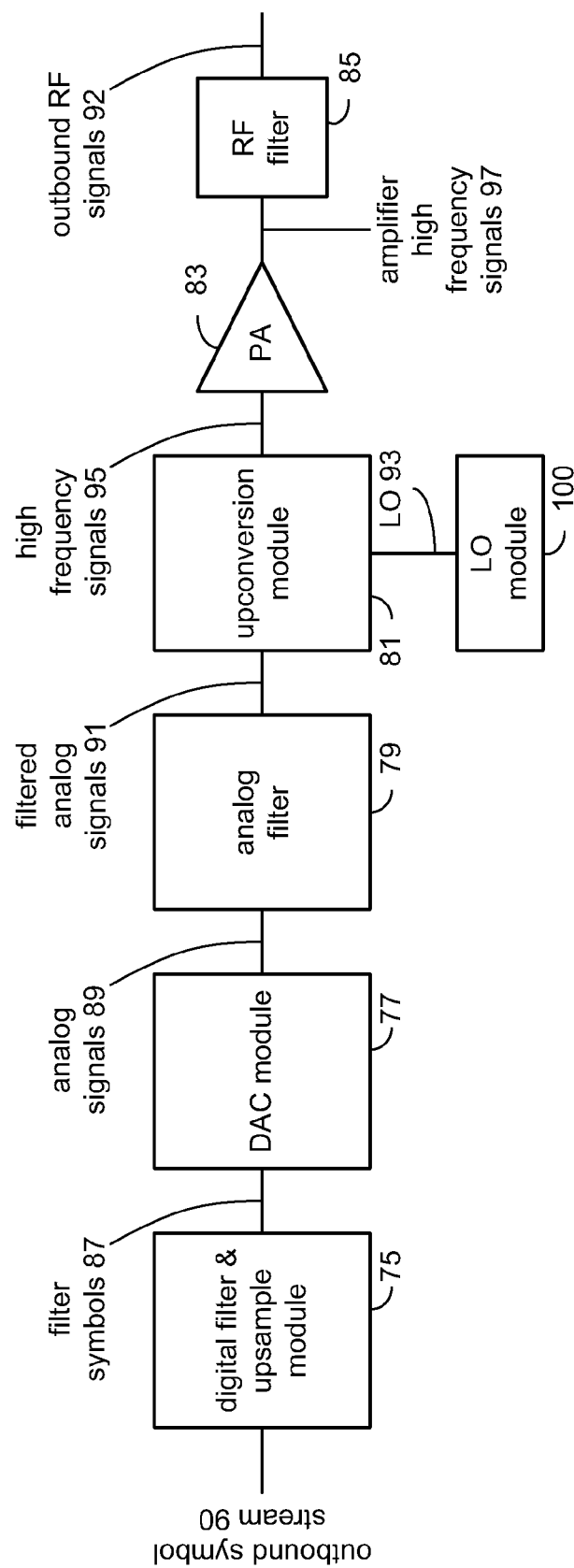
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
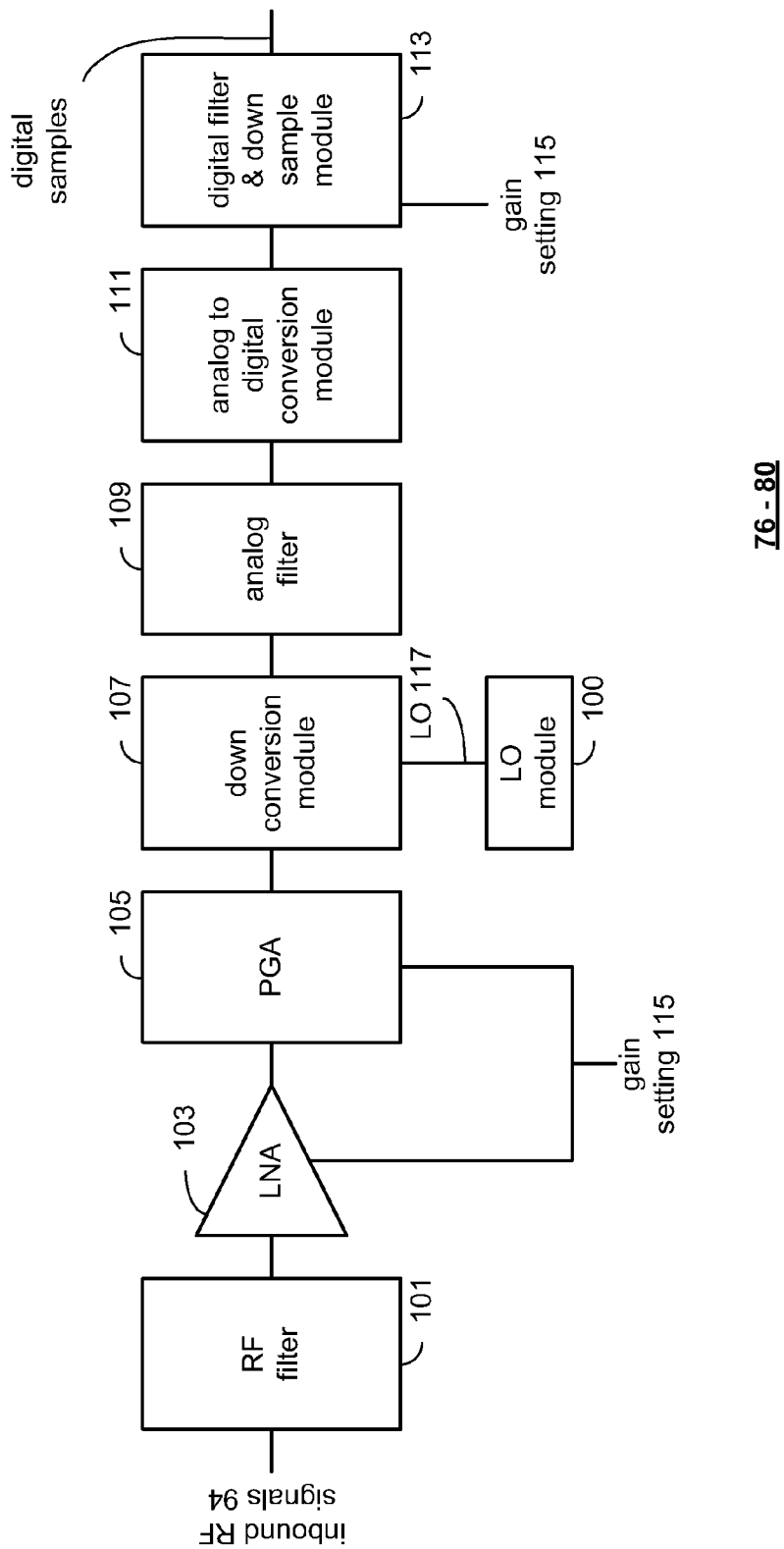
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
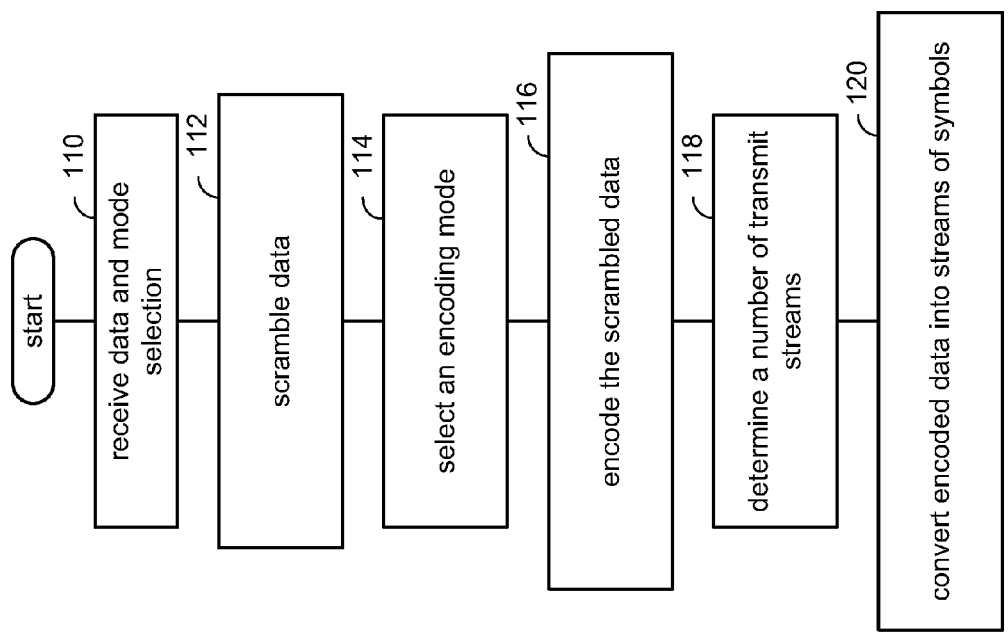
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
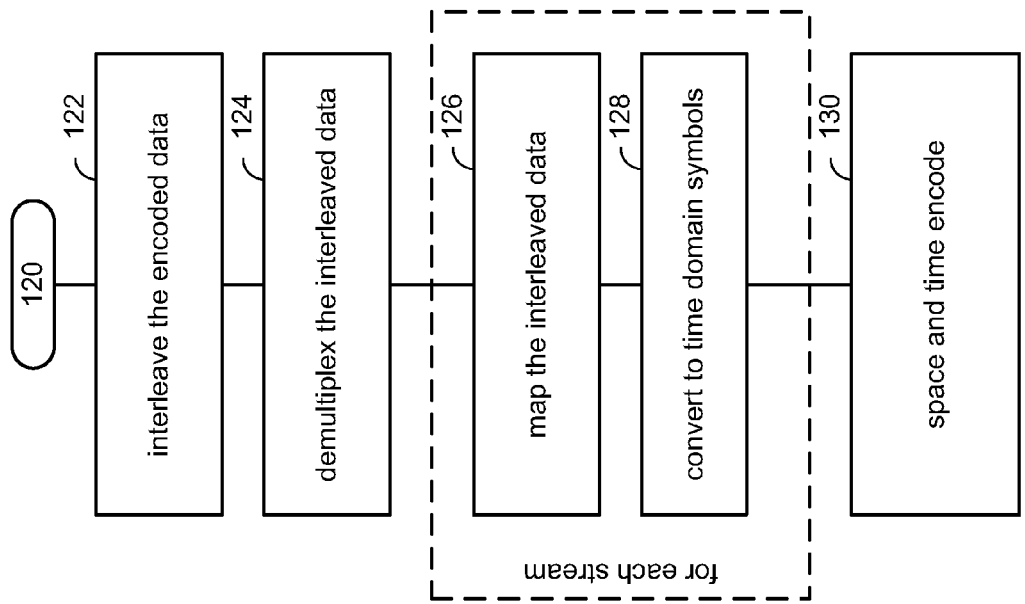
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
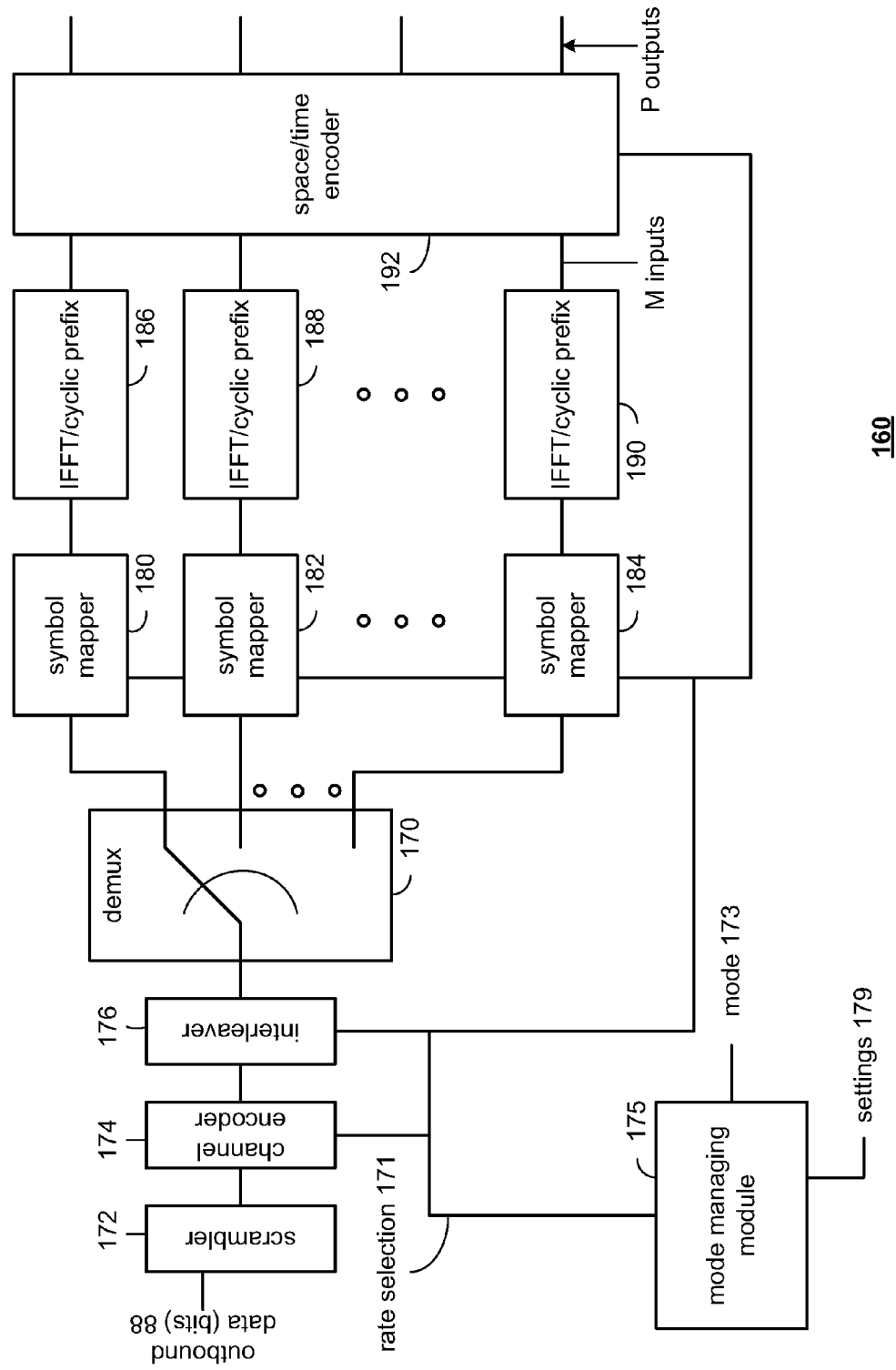
FIGS. 10A and 10B are diagrams illustrating embodiments of a radio transmitter.
Figure 10B:
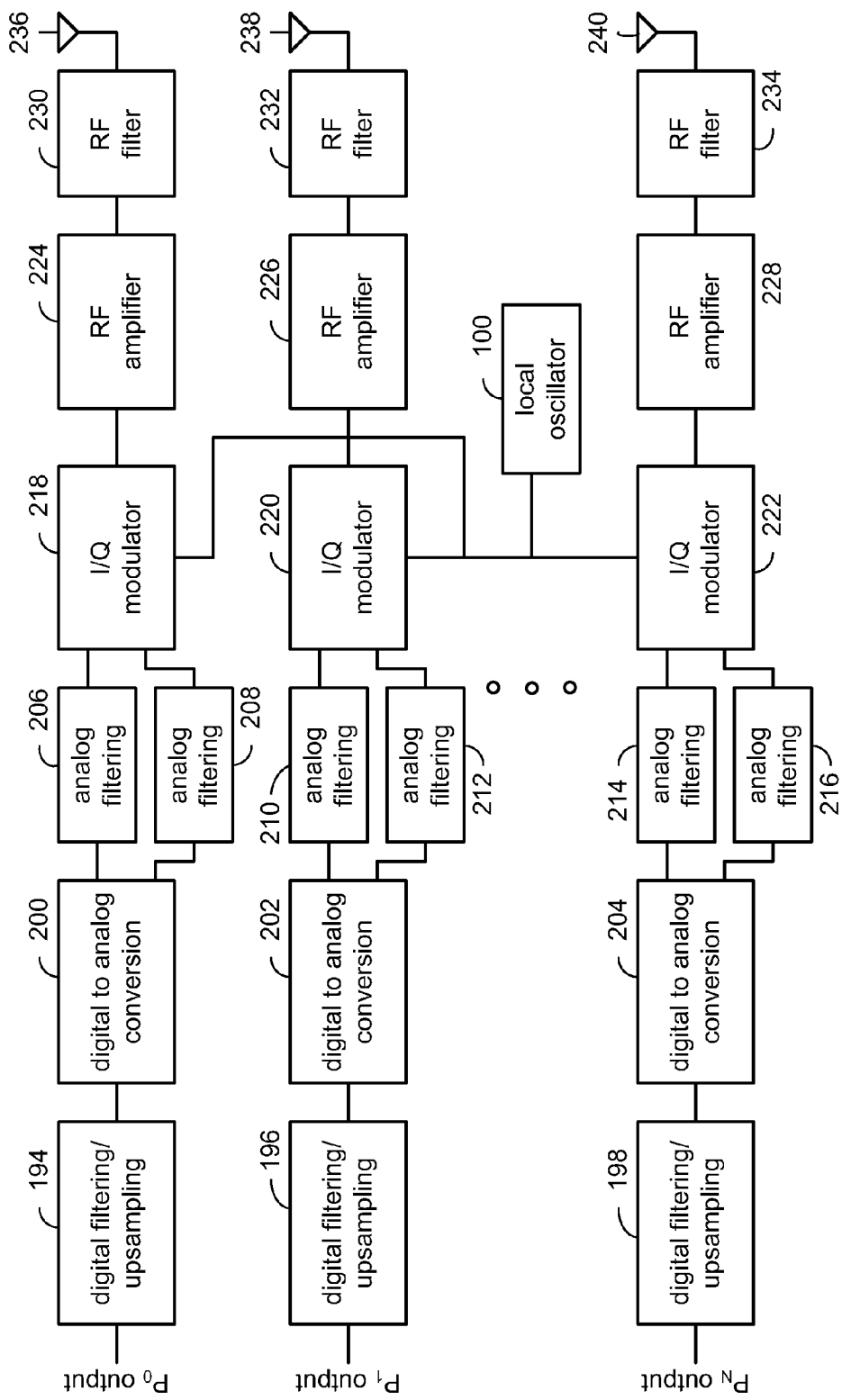

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
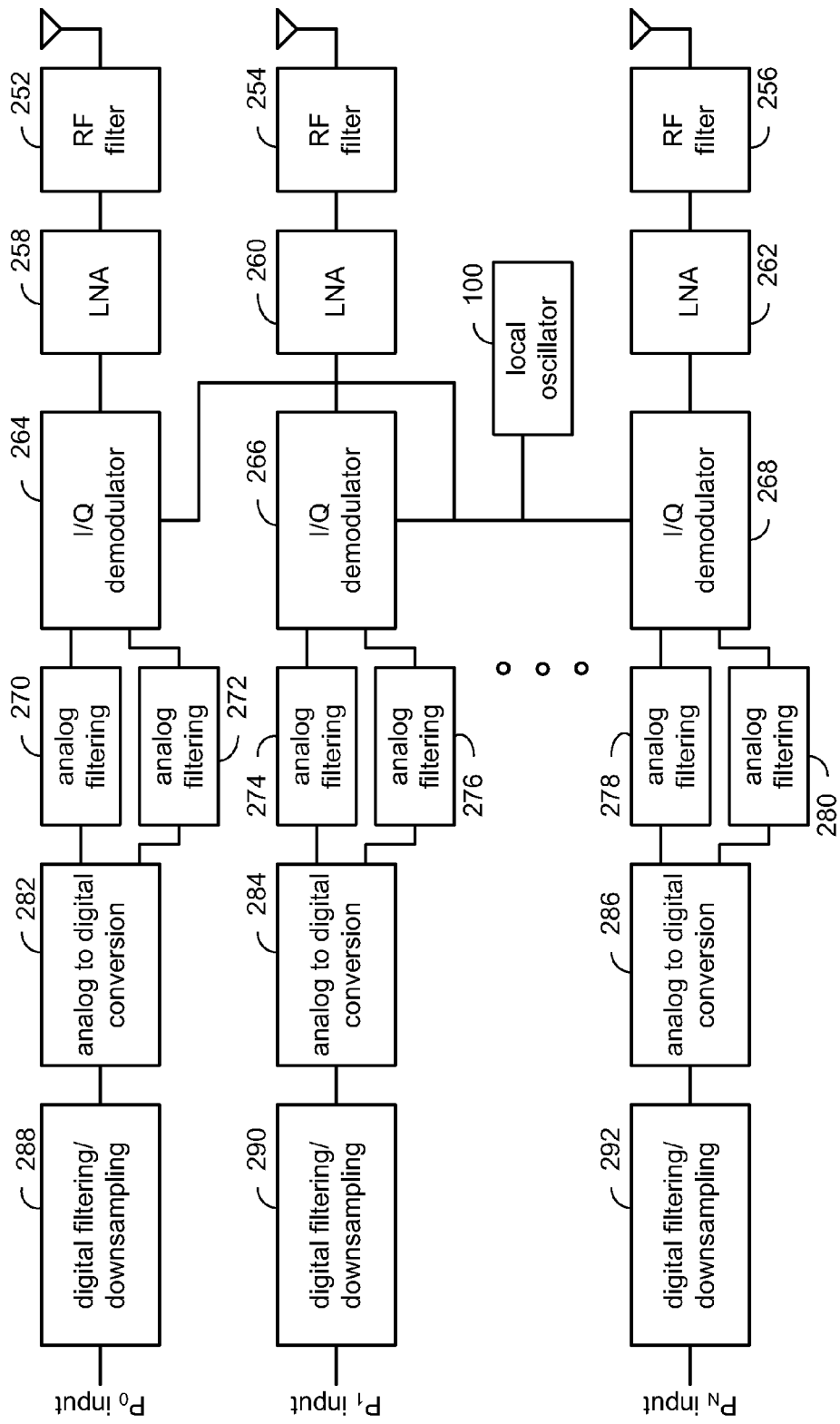
FIGS. 11A and 11B are diagrams illustrating embodiments of a radio receiver.
Figure 11B:
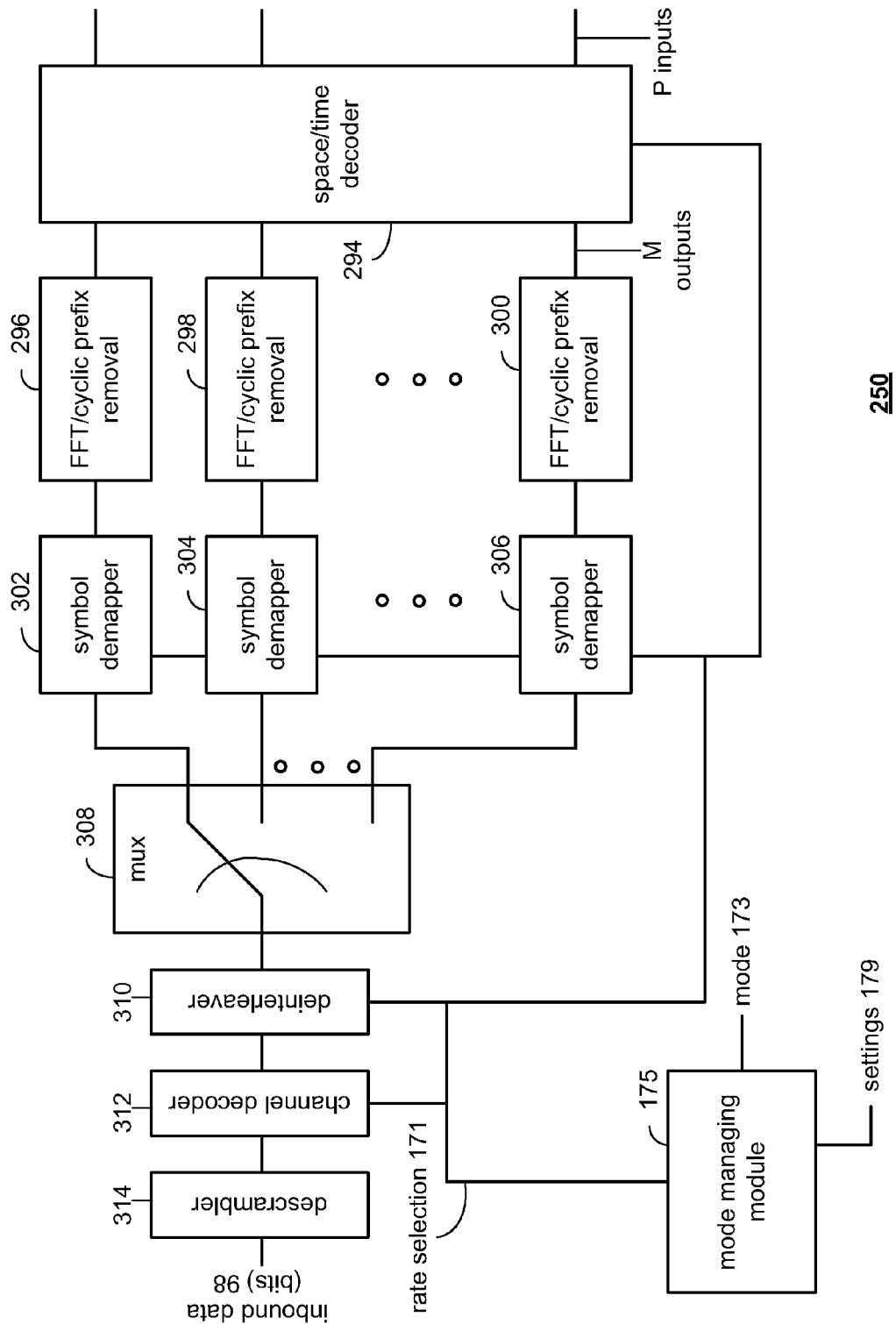

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
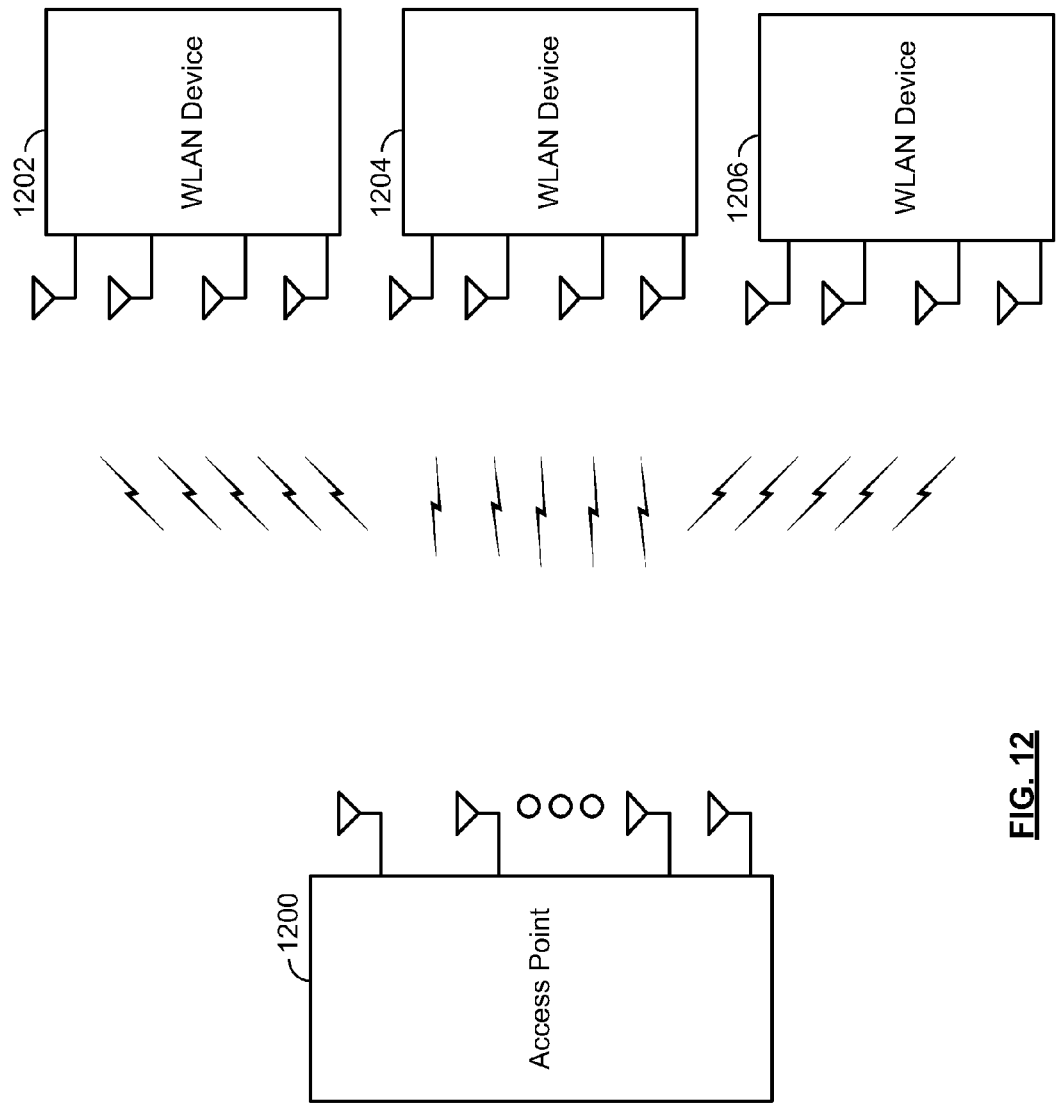
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Figure 13:
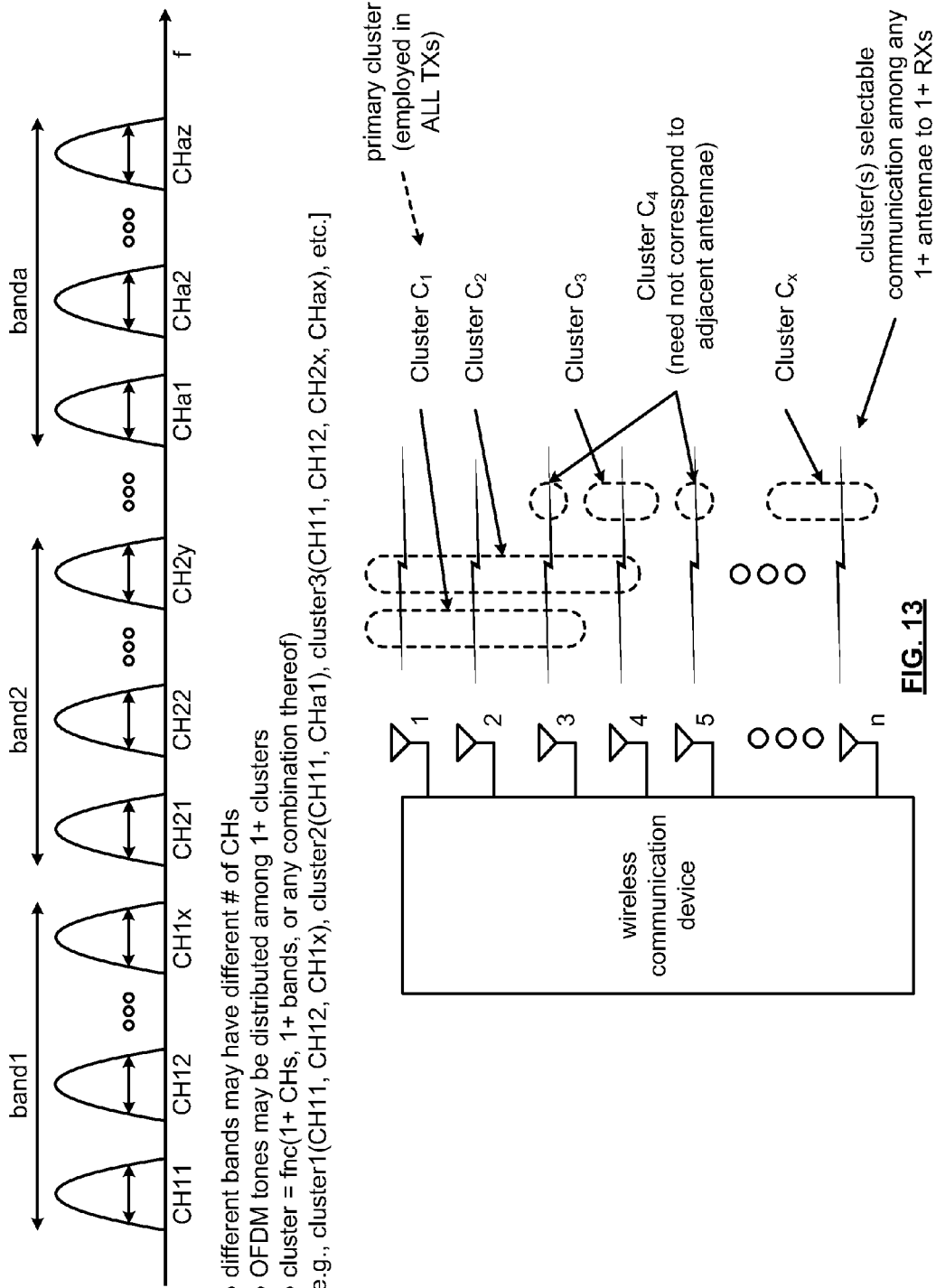
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Figure 14:
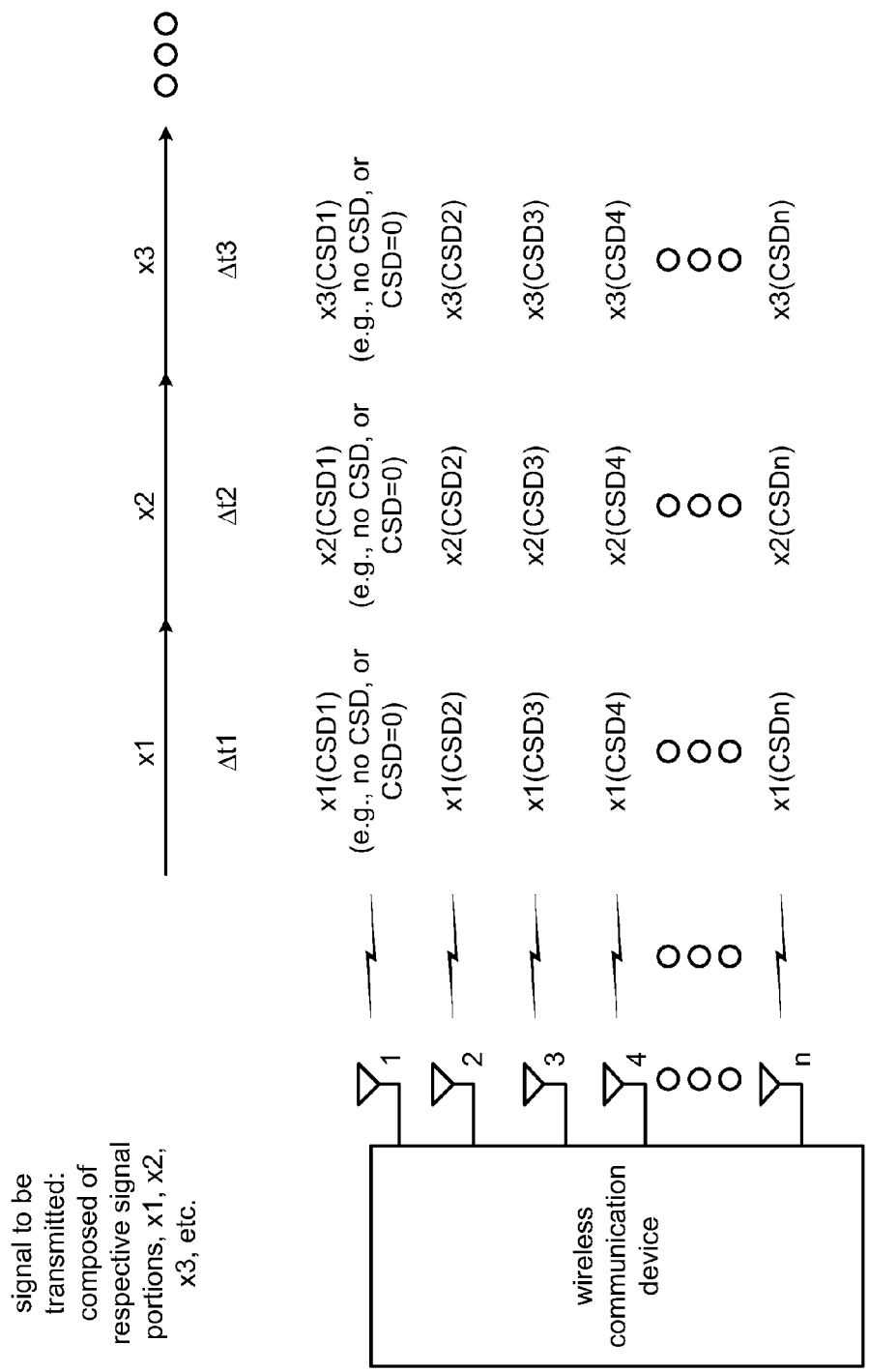
FIG. 14 is a diagram illustrating alternative embodiment of wireless communication device (e.g., AP, WLAN device, or other wireless communication device) having multiple antennae operating in accordance with cyclic shift delay (CSD).

FIG. 14 is a diagram illustrating alternative embodiment of wireless communication device (e.g., AP, WLAN device, or other wireless communication device) having multiple antennae operating in accordance with cyclic shift delay (CSD). Again, the wireless communication device of this diagram may be of any of a wide variety of types of wireless communication devices (such as an AP, a WLAN device, and/or any of those depicted in FIG. 1, etc.).

The wireless communication device includes a number of antennae (shown generally as including up to n antennae, where n is an integer). In accordance with CSD among signals transmitted via the respective antennae, various portions of a signal (and other signals corresponding thereto) are transmitted at different times. For example, a signal may be viewed as being composed of multiple signal portions x1, x2, x4, and so on (e.g., each being of a common length or duration, such as each being 4 μsec in one embodiment). During a first time (shown as Δt1), the first signal portion x1 is transmitted from antenna 1 with a first CSD (e.g., shown as x1(CSD1)). In a preferred embodiment, the CSD1 value is actually a zero-valued CSD (i.e., no CSD is applied to the signal portion x1 transmitted from antenna 1. A variant of the first signal portion x1 is transmitted from antenna 2 with a second CSD (e.g., shown as x1(CSD2)) during the first time (shown as Δt1); that is to say, the first signal portion x1 undergoes a respective cyclic shift [using a value, CSD2] and is then transmitted from antenna 2 during the first time (shown as Δt1).

Analogously, a variant of the first signal portion x1 is transmitted from antenna 3 with a third CSD (e.g., shown as x1(CSD3)) during the first time (shown as AU); that is to say, the first signal portion x1 undergoes a respective cyclic shift [using a value, CSD3] and is then transmitted from antenna 3 during the first time (shown as Δt1).

Analogously, a variant of the first signal portion x1 is transmitted from antenna 4 with a fourth CSD (e.g., shown as x1(CSD4)) during the first time (shown as AU); that is to say, the first signal portion x1 undergoes a respective cyclic shift [using a value, CSD3] and is then transmitted from antenna 4 during the first time (shown as AU).

This process is performed across all of the antennae of the wireless communication device. For example, a variant of the first signal portion x1 is transmitted from antenna n with an n-th CSD (e.g., shown as x1(CSDn)) during the first time (shown as Δt1); that is to say, the first signal portion x1 undergoes a respective cyclic shift [using a value, CSDn] and is then transmitted from antenna n during the first time (shown as Δt1).

The other signal portions of the original signal (e.g., x2, x3, etc.) also undergo analogous CSD processing during subsequent time durations for transmission from the various antennae of the wireless communication device as shown in the diagram.

Stated another way, antenna 1 is transmitting some signal, such as denoted as original signal x(t) (e.g., composed of respective signal portions x1, x2, x3, and so on). The original signal x(t) can be viewed as composed of multiple pieces of signals each last for a common length or direction (e.g., T μsec, where T is 4 is one embodiment)

The original signal x(t) may be viewed or written as follows:

$$x(t)=x,0(t)+x,1(t-T)+x,2(t-2T)+\ldots \text{ and so,}$$

where each signal piece x,m(t−mT) only spans [mT, (m+1)T].

The respective signals transmitted from antenna 2 up to antenna n are all constructed from antenna 1. That is to say, the signal transmitted from antenna 2 up to antenna n are respectively generated by performing a respective cyclic shift on the signal being transmitted from antenna 1. All antennas transmit signals at the same time (e.g., simultaneously and/or in parallel with each other).

However, the m-th piece of the signal from antenna n is a cyclic delayed version of the m-th piece of signal from antenna 1. The cyclic delay value is denoted as Delta_t[n−1]. Mathematically, it can represented as: xn,m(t−mT)=x,m((t−mT−Delta_t[n−1]) mod T).

The selection of the delays for each of the respective antenna can significantly affect the performance of the communications sent from the wireless communication device. For example, without any CSD employed among the various antennae, there may be the situation in which signals from certain of the antennae interfere with one another. In some cases, this interference is constructive (e.g., the signals add to one another), and in other cases, it may be destructive (e.g., the signals may cancel one another out). When the signals from the various antennae are transmitted simultaneously and in phase with one another (e.g., phase aligned), unintentional beamforming may result in which, because of various effects such as reflections, multi-path, etc., certain of the signals may interfere with one another even cancel each other out.

CSD is employed to include respective shifts with respect to one another, as a function of time, in which signals are transmitted are different respective times and not simultaneously with respect to one another or in parallel. The delays incurred by the CSD ensures for variability in frequency thereby limiting (ideally, ensuring) that such unintentional beamforming and cancellation does not occur among the various signals. A means of determining the values associated with the respective delays of the antennae in accordance with the CSD is presented herein, as well as criteria employed for determining which (if any) potential solutions are suitable for use. For example, empirical modeling and searching among a number of possible solutions can be performed to provide for optimal performance among the various transmitted signals.

For example, the wireless communication device of this diagram includes the various antennae for supporting communications with at least one additional a wireless communication device. These antennae operate by employing a legacy cyclic shift delayed (CSD) for transmitting a signal that is composed, at least, of a preamble and a payload. In other words, such an appropriately designed CSD, constructed in accordance with at least some of the principles and aspects herein, may be applied to the signal to ensure that such a resulting signal, after undergoing post-automatic gain control (AGC) processing within a wireless communication device, does not have largely different power fluctuations between the various portions of the preamble (e.g., between a legacy portion of the preamble and a very high throughput (VHT) portion of the preamble). The tolerance of what constitutes a 'large' power fluctuation may vary from application to application, or based on certain designer-defined or design-defined constraints (e.g., 0.1%, 0.2%, 0.5%, 1%, 2%, 5%, etc.). Any such constraint used for defining acceptably small different power fluctuations between the various portions of the preamble may be employed without departing from the scope and spirit of the invention.

In certain embodiments, the preamble of such a signal is composed, at least, of a legacy portion (e.g., such as that is compliant with IEEE 802.11a, 802.11g, 802.11n, etc.) and a very high throughput (VHT) portion (e.g., such as that is compliant with IEEE 802.11 ac, multi-user multiple input multiple output (MU-MIMO), orthogonal frequency division multiple access (OFDMA), MU-MIMO/OFDMA, etc.). Stated another way, a preamble of a signal may be composed, at least, of a first portion corresponding to a first communication protocol and a second portion corresponding to a second communication protocol. The CSD as applied to the signal to ensure that such a resulting signal, after undergoing post-automatic gain control (AGC) processing within a wireless communication device, does not have largely different power fluctuations (as corresponding to the particular application) between the various portions of the preamble (e.g., between a legacy portion of the preamble and a very high throughput (VHT) portion of the preamble).

In certain embodiments, appropriately designed CSD, as applied to a first portion of the preamble (e.g., a legacy preamble portion, portion corresponding to legacy devices such as IEEE 802.11x, where x is a, g, n, etc.), is optimized for ensuring an automatic gain control (AGC) power setting for minimizing an error between power associated with the first (e.g., legacy) portion of the preamble and power associated with a second (e.g., VHT) portion of the preamble. In other words, the various portions of the signal have respective powers associated therewith when the signal is transmitted. For example, when a portion of the signal associated with the first (e.g., legacy) portion of the signal's preamble is transmitted, there is a first power associated therewith. When a second (e.g., VHT) portion of the signal's preamble is transmitted, there is a second power associated therewith.

An appropriately selected CSD, as applied to the legacy portion of the preamble, ensures that the power associated with the various portions of the preamble (e.g., a first or legacy preamble portion and a second or VHT preamble portion) are substantially similar thereby ensuring a minimal AGC power error there between. In other words, the ideal AGC will ensure zero AGC power error the various portion of the signal.

This approach of optimization of the legacy CSD can be applied generally to any number of antennae (e.g., n antennae, where n is any desired integer), and in one instance, is particularly tailored to a wireless communication device including 4, 5, 6, 7, or 8 antennae. Of course, this may be adapted to a wireless communication device including any number of antennae (e.g., n antennae, where n is any desired integer). This may be optimized for ensuring an automatic gain control (AGC) power setting for minimizing an error between first power associated with the legacy portion and a second power associated with the VHT portion.

Figure 15:
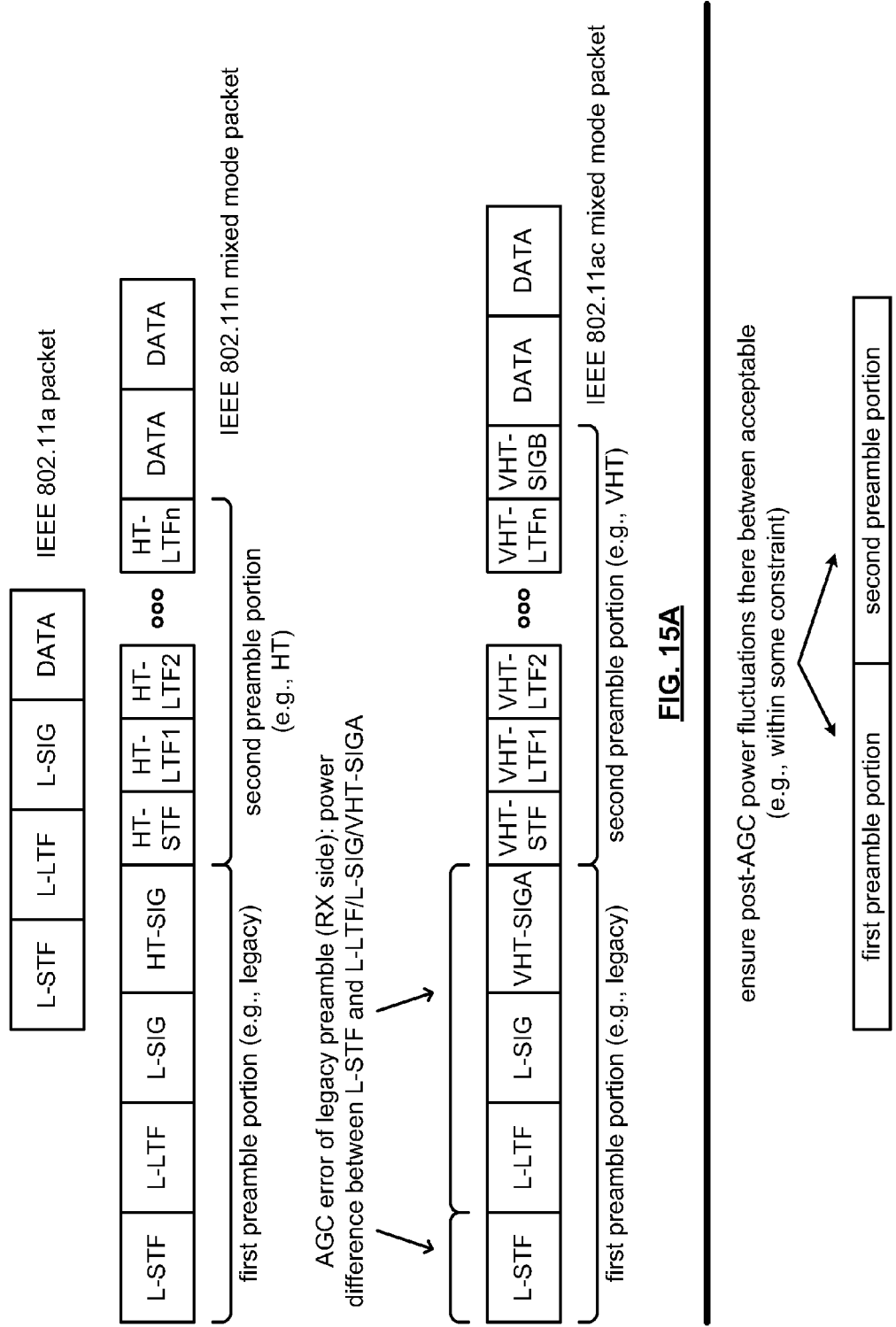
FIG. 15A is a diagram illustrating an embodiment of a frame format that may be used in conjunction with a wireless communication device such as a WLAN device.
FIG. 15B is a diagram illustrating an embodiment of the preamble portion a frame (having at least two portions therein) that may be used in conjunction with a wireless communication device such as a WLAN device.

FIG. 15A is a diagram illustrating an embodiment of a frame format that may be used in conjunction with a wireless communication device such as a WLAN device. Packet construction in accordance with the various principles presented herein, generally speaking, may include a preamble, a signal field, and a payload. Again, generally, the preamble is used for carrier acquisition, synchronization, channel estimation, etc. The signal field is used to communicate frame specific parameters (e.g., coding rate, frame length, etc.) to a receiving device. The payload is the data portion of the packet.

A frame format may be modified based on a number of parameters, including, dependence upon the presence of other wireless communication devices in a communication system. In some instances, a communication may include various types of wireless communication devices having different respective capability sets (e.g., legacy devices, newer devices, mixed mode devices, etc.).

For example, with some embodiments, in the 5 GHz spectrum, legacy devices may include those being compliant in accordance with IEEE 802.11(a) and IEEE 802.11(n). Legacy devices must be able to recognize that a packet has been transmitted and remain off the air for the duration of the packet (i.e., not transmit energy into the communication channel or communication medium in order to give access to other communication devices). Thus, packets formed in accordance with the various aspects presented herein may include certain portions therein that are compliant with legacy or prior standards, recommended practices, etc. As one example, a new packet may include a legacy preamble and a signal field along with a new, modified version of a payload. With such a novel packet structure, a legacy device will still be able to recognize the legacy preamble and decode the legacy signal field. The legacy signal field contains information that tells the legacy devices how long the packet will be on the air (i.e., occupy or be using the communication channel or communication medium). The legacy signal field does not contain IEEE 802.11 ac specific parameters (these are contained in the IEEE 802.11 ac signal field).

A packet having a particular type of frame format, such as a Greenfield packet that does not include certain portions therein that are compliant with legacy or prior standards, recommended practices, etc. (i.e., non legacy supporting), may be used when only new version devices are present (e.g., no legacy or prior devices having compatibility with previous standards and/or recommended practices). Such a packet structure (Greenfield) need not include a legacy compatible preamble or a legacy compatible signal field, since no such devices are present. The Greenfield packet may have a shorter preamble and a signal field that yields a higher throughput.

Various packet structures are illustrated herein as being compliant with various IEEE 802.11x standards (e.g., where x is a, n, ac, respectively). An IEEE 802.11a packet is shown including a legacy short training field (L-STF), a legacy long training field (L-LTF), a legacy signal field (L-SIG), followed by a data field.

An IEEE 802.11n mixed mode packet is shown including a legacy short training field (L-STF), a legacy long training field (L-LTF), a legacy signal field (L-SIG), a high throughput signal field (HT-SIG), a high throughput short training field (HT-STF), multiple high throughput long training fields (HT-LTFs), followed by one or more data fields.

An IEEE 802.11ac mixed mode packet is shown including a legacy short training field (L-STF), a legacy long training field (L-LTF), a legacy signal field (L-SIG), a first very high throughput signal field (VHT-SIGA), a very high throughput short training field (VHT-STF), multiple very high throughput long training fields (VHT-LTFs), a second very high throughput signal field (VHT-SIGB), followed by one or more data fields.

The IEEE 802.11ac packet includes the IEEE 802.11a preamble and signal field for detection by devices compliant with and operable with IEEE 802.11a. Such a packet may have set a fixed rate of information of 6 Mbps and a corresponding length based on its respective time on the air (i.e., time being transmitted via the communication channel or communication medium). The IEEE 802.11ac mixed mode packet is limited to the time on the air (channel/medium) corresponding to the maximum size of an IEEE 802.11a packet.

The IEEE 802.11ac mixed mode packet includes portions of the IEEE 802.11n preamble and signal field for detection by devices compliant with and operable with IEEE 802.11n. When using the structure that is compatible with devices compliant with and operable with IEEE 802.11n, the rate is set to modulation code set (MCS) 0, regular Guard Interval (GI), no space time block coding (STBC), and a corresponding length based on time on air (channel/medium).

The legacy portion of the preamble for the IEEE 802.11n mixed mode packet starts from L-STF to HT-SIG. The legacy portion of the preamble for the IEEE 802.11ac mixed mode packet starts from L-STF to VHT-SIGA.

As may be understood with respect to various embodiments, the HT-SIG field (e.g., such as with respect to an IEEE 802.11n mixed mode packet) need not be employed in all embodiments (e.g., several embodiments do not use such a HT-SIG field). When an HT-SIG field is employed in a particular embodiment, it may be necessary for such a HT-SIG cyclic redundancy check (CRC) to be valid so that HT device accepts the signal field and defers the medium (i.e., does not occupy the channel/air).

With respect to a signal field (SIG) as employed within such multi-user packets as described herein, or variants thereof, the SIG field may be distributed or partitioned into at least two separate signal fields (e.g., SIG A and SIG B such as with respect to the IEEE 802.11ac mixed mode packet) that are located in different portions of the multi-user packet. In certain embodiments, a first SIG field (e.g., SIG A) may be implemented in a portion of a multi-user packet that corresponds to a first operational mode (e.g., a legacy operational mode), and a second SIG field (e.g., SIG B) may be implemented in a portion of a multi-user packet that corresponds to a second operational mode (e.g., an IEEE 802.11ac (VHT) operational mode).

It is noted, that while the terminology of a multi-user packet is used in various embodiments herein and in accordance with various aspects of the invention, such a packet may also support single user (SU) operation (e.g., such as in accordance with single user multiple input multiple output (SU-MIMO)) in certain embodiments. The terminology of multi-user packet is nonetheless employed herein because such a format of a packet can be simultaneously compliant with and adapted to both single user (SU) and multi-user (MU) operation (e.g., multi-user multiple input multiple output (MU-MIMO), orthogonal frequency division multiple access (OFDMA), or combination OFDMA/MU-MIMO).

A first of the SIG fields includes information that may be processed and decoded by all wireless communication devices within a communication system, and a second of the SIG fields includes information that is specific to one or more particular wireless communication devices within the communication system (e.g., pertaining to a specific once or more wireless communication devices, such as a specific, individual wireless communication device or a specific subset or group of the wireless communication devices within the communication system).

With respect to a given packet, certain of the wireless communication devices may receive, process and decode the first of the SIG fields (e.g., SIG A) and the second of the SIG fields (e.g., SIG B) within a distributed SIG field, while other of the wireless communication devices may only receive the first of the SIG fields (e.g., SIG A) (e.g., such as if any precoding (steering) multi-user (MU) weights do not correspond to those respective wireless communication devices).

For example, legacy wireless communication devices (i.e., devices that are compliant with an older version of a wireless communication standard) having such a capability would then not process and decode both the first of the SIG fields (e.g., SIG A) and the second of the SIG fields (e.g., SIG B) within a distributed SIG field. Generally speaking, multiple or all of the receiving wireless communication devices are typically operative to process and decode a first component of the distributed SIG field (e.g., SIG A), and those wireless communication devices for which the second portion is intended (e.g., those for which the precoding (steering) multi-user (MU) weights correspond) would then be operative to receive, process and decode both the first of the SIG fields (e.g., SIG A) and the second of the SIG fields (e.g., SIG B) within a distributed SIG field.

Again, it is a noted that while the first component of the distributed SIG field (e.g., SIG A) may be able to be processed and decoded by most or all of the receiving wireless communication devices, all of those receiving wireless communication devices may not necessarily use any or all of the information therein (e.g., such a receiving wireless communication device may operate by discarding all of part of the multi-user packet).

With respect to the locations of such a first component of the distributed SIG field (e.g., SIG A) and as second component of the distributed SIG field (e.g., SIG A), a designer is given wide latitude regarding their respective locations within such a multi-user packet. The precise locations of the at least first and second SIG fields within a multi-user packet may be varied. For example, particular where a first SIG field (e.g., SIG A) and a second SIG field (e.g., SIG B) are located may vary per application, by design or implementation choice, etc. For example, in some embodiments, the second component of the distributed SIG field (e.g., SIG B, including user-specific information) is located before a data field in the multi-user packet and at least one additional field is located between the second component of the distributed SIG field (e.g., SIG B) and the data field (e.g., in which one or more VHT-LTFs are located in between the second component of the distributed SIG field (e.g., SIG B) and the data field). In another embodiment, the second component of the distributed SIG field (e.g., SIG B, including user-specific information) is located adjacent to and preceding a data field in the multi-user packet.

Also, within certain embodiments, the manner in which the various components of the distributed SIG field may be transmitted from a wireless communication device differently. For example, a first component of the distributed SIG field (e.g., SIG A) may be transmitted omni-directionally from a transmitting wireless communication device, while a second component of the distributed SIG field (e.g., SIG B) may be transmitted from a transmitting wireless communication device in accordance with pre-coding or beamforming. In other words, the manner of transmission may be modified as a function of various components within a multi-user packet (e.g., a first portion transmitted in accordance with a first manner, and a second portion transmitted in accordance with a second manner). Such variable transmission functionality (e.g., SIG A omni-directionally and SIG B in accordance with pre-coding or beamforming) may be operative to ensure that all of the receiving wireless communication devices are able to receive and process a first portion of the distributed SIG field that includes information that may be used by multiple of the wireless communication devices (e.g., SIG A), while a second portion of the distributed SIG field (e.g., SIG B) is targeted for and processed only by those wireless communication devices for which the second portion of the distributed SIG field (e.g., SIG B) is intended. In one embodiment, such pre-coding or beamforming as may be performed for the second portion of the distributed SIG field (e.g., SIG B) may be in accordance with space division multiple access (SDMA) signaling; such SDMA may be targeted to one or more of the receiving wireless communication devices.

Different formats of such multi-user packet may be employed to effectuate the respective and different operational modes of single user (SU), multi-user (MU) resolvable LTFs, and MU non-resolvable LTFs operational modes. For example, the preamble structure may vary for each of these various operational modes (the SU, MU resolvable LTFs, and MU non-resolvable LTFs operational modes). In some instances, having different frame formats for each respective operational mode may yield a more efficient (e.g., shorter) preamble structure for some of the cases. However, for other of the cases, there may be an increase in complexity (e.g., VHT devices oftentimes need to handle multiple frame formats, and would then need to accommodate the multiple frame formats being employed). To ensure a more simplistic and less complex approach, a common or same frame format may be employed in some embodiments.

When employing different types of frame formats, indicating which preamble is being used in a particular instance may be signaled in one of the fields of the multi-user packet (e.g., in the first component of the distributed SIG field, VHT-SIG-A field using one or more of the following (or equivalent) bits: MU-MIMO bit, and VHT-LTF Mode bit.

In some embodiments, a HT-SIG field may be inserted after the L-SIG field for proper deferral of HT devices (e.g., IEEE 802.11n devices). In alternative embodiments, the first component of the distributed SIG field (e.g., VHT-SIG-A) may be replaced by HT-SIG for proper deferral of HT devices (e.g., IEEE 802.11n devices).

When operating in accordance with SU-MIMO, beamforming and precoding (steering) may also be employed when transmitted such multi-user packets (e.g., such as in accordance with certain portions of the IEEE 802.11n specification). It is noted that, when operating in accordance with SU-MIMO, the first of the SIG fields (e.g., SIG A) may include all of the necessary information for processing and decoding at least one field within the multi-user packet (e.g., the second of the SIG fields (e.g., SIG B) may include no such relevant and useful information therein for use in processing and decoding at least one field within the multi-user packet).

FIG. 15B is a diagram illustrating an embodiment of the preamble portion a frame (having at least two portions therein) that may be used in conjunction with a wireless communication device such as a WLAN device. As may be understood, an appropriately designed CSD may be applied to a first portion of a preamble to ensure that post-AGC power fluctuations between this portion and at least one additional portion is acceptable (e.g., acceptably small or tolerable within a certain desired tolerance). Generally speaking, a preamble portion may be viewed as including, at least, two different portions (i.e., a first preamble portion and a second preamble portion). An appropriately designed CSD is applied to the first portion (which may be viewed as being a legacy preamble portion) so as to minimize the power fluctuations of the post AGC signal (e.g., on the receiver side).

With respect to the optimization criteria employed herein for the design and construction of legacy CSD, the CSDs are designed in accordance with the constraint as being multiples of 25 ns. Each respective CSD value is selected in accordance with the constraint of being within the range of [−200 ns 0 ns].

The optimization criteria related to minimizing the 95 percentile of the absolute power difference between two different portions of the preamble (i.e., the L-STF and VHT-STF portions of the preamble) for the IEEE 802.11n channel models B/C/D/E. The difference of the AGC settings are minimized between legacy portion and the VHT portion of the IEEE 802.11ac frames. The design is implemented effectively to minimize the power fluctuation of the post AGC signal.

In order to capture the random initial phase offset of the transmit (TX) chain, the following two (2) cases are considered: (1) 0 deg phase shift between even and odd TX antennas, and (2) 180 deg phase shift between even and odd TX antennas.

Figure 16:
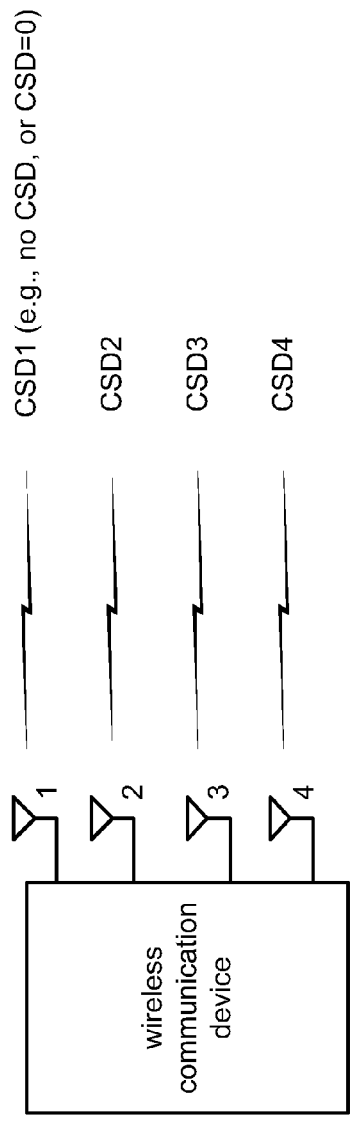
FIG. 16 is a diagram illustrating an embodiment of legacy cyclic shift delay (CSD) that may be employed for communication devices operating in accordance with IEEE 802.11n having and using between 1 and 4 antennae, inclusive.

FIG. 16 is a diagram illustrating an embodiment of legacy cyclic shift delay (CSD) that may be employed for communication devices operating in accordance with IEEE 802.11n having and using between 1 and 4 antennae, inclusive. This diagram shows the CSD values (i.e., in a CSD table) as may be employed by a wireless communication device for effectuating CSD of the legacy preamble portion of a packet or signal when the wireless communication device has and uses anywhere from 1 and 4 antennae, inclusive (i.e., NTX=1, 2, 3, or 4).

Herein, it is proposed to re-use the IEEE 802.11n legacy CSD for embodiments in which anywhere between 1 and 4 transmit antennae are employed (i.e., NTX≤4) within a wireless communication device. A 95 percentile of the absolute power difference between L-STF and VHT-STF for the IEEE 802.11n channels provides the CSDs respectively shown in the diagram.

Figure 17:
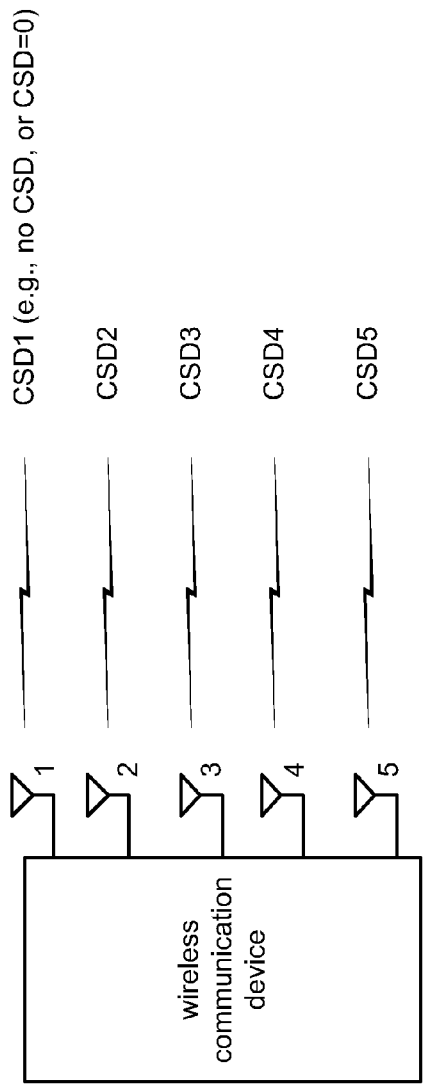
FIG. 17 is a diagram illustrating an embodiment of optimal legacy CSDs that may be employed for communication devices employing five (5) antennae operating in accordance with a communication protocol (e.g., IEEE 802.11ac).

FIG. 17 is a diagram illustrating an embodiment of optimal legacy CSDs that may be employed for communication devices employing five (5) antennae operating in accordance with a communication protocol (e.g., IEEE 802.11ac). Using the design constraint of a 95 percentile of the absolute power difference between L-STF and VHT-STF for the IEEE 802.11n channels provides the CSDs respectively shown in the diagram within a wireless communication device that operates using five (5) antennae.

Figure 18:
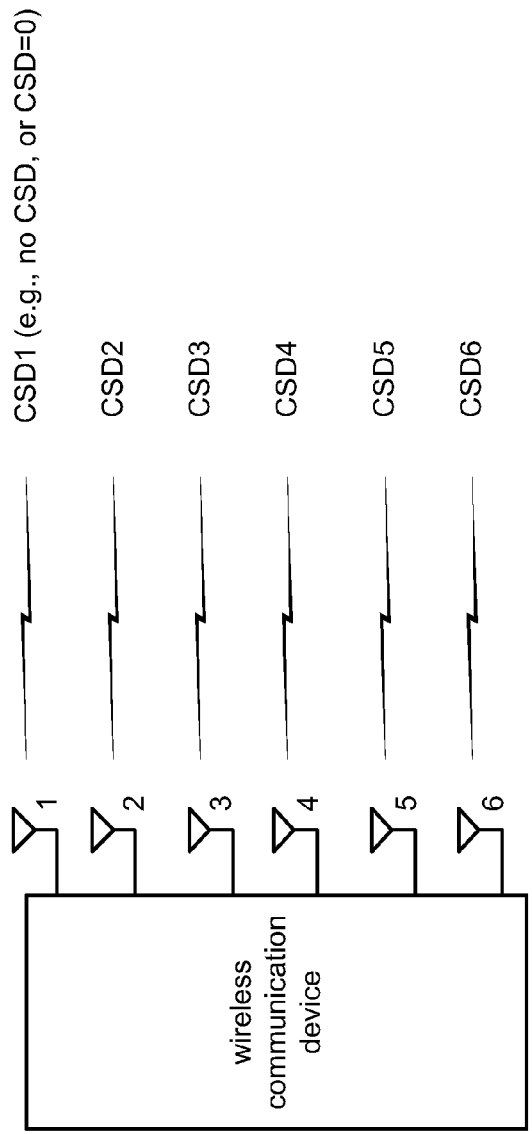
FIG. 18 is a diagram illustrating an embodiment of optimal legacy CSDs that may be employed for communication devices employing six (6) antennae operating in accordance with a communication protocol (e.g., IEEE 802.11ac).

FIG. 18 is a diagram illustrating an embodiment of optimal legacy CSDs that may be employed for communication devices employing six (6) antennae operating in accordance with a communication protocol (e.g., IEEE 802.11ac). Using the design constraint of a 95 percentile of the absolute power difference between L-STF and VHT-STF for the IEEE 802.11n channels provides the CSDs respectively shown in the diagram within a wireless communication device that operates using six (6) antennae.

Figure 19:
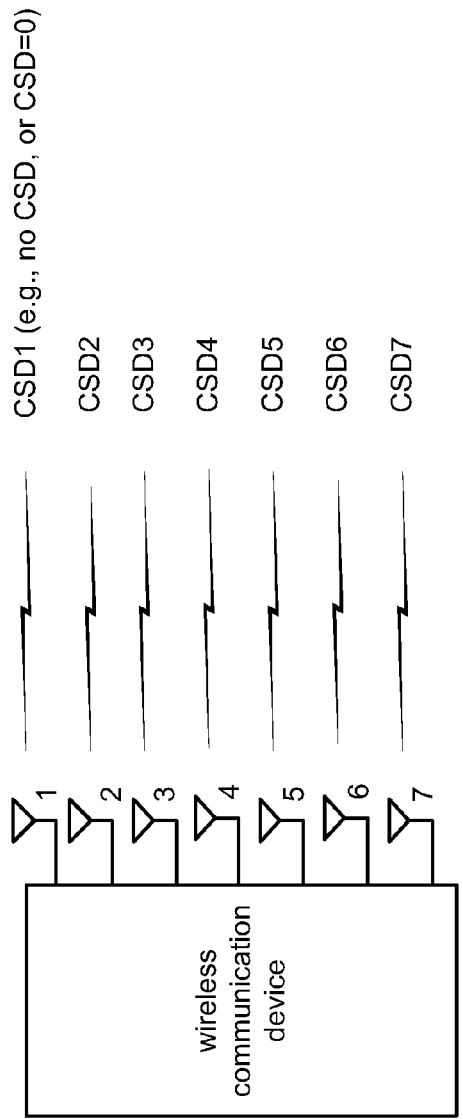
FIG. 19 is a diagram illustrating an embodiment of optimal legacy CSDs that may be employed for communication devices employing seven (7) antennae operating in accordance with a communication protocol (e.g., IEEE 802.11ac).

FIG. 19 is a diagram illustrating an embodiment of optimal legacy CSDs that may be employed for communication devices employing seven (7) antennae operating in accordance with a communication protocol (e.g., IEEE 802.11ac). Using the design constraint of a 95 percentile of the absolute power difference between L-STF and VHT-STF for the IEEE 802.11n channels provides the CSDs respectively shown in the diagram within a wireless communication device that operates using seven (7) antennae.

With respect to this diagram, it can be seen that more than eight optimal CSDs are shown; the very bottom option of CSDs has some commonality with respect to other most optimal CSDs for embodiments employing other numbers of antennae (e.g., NTX=5, 6, and 8).

Figure 20:
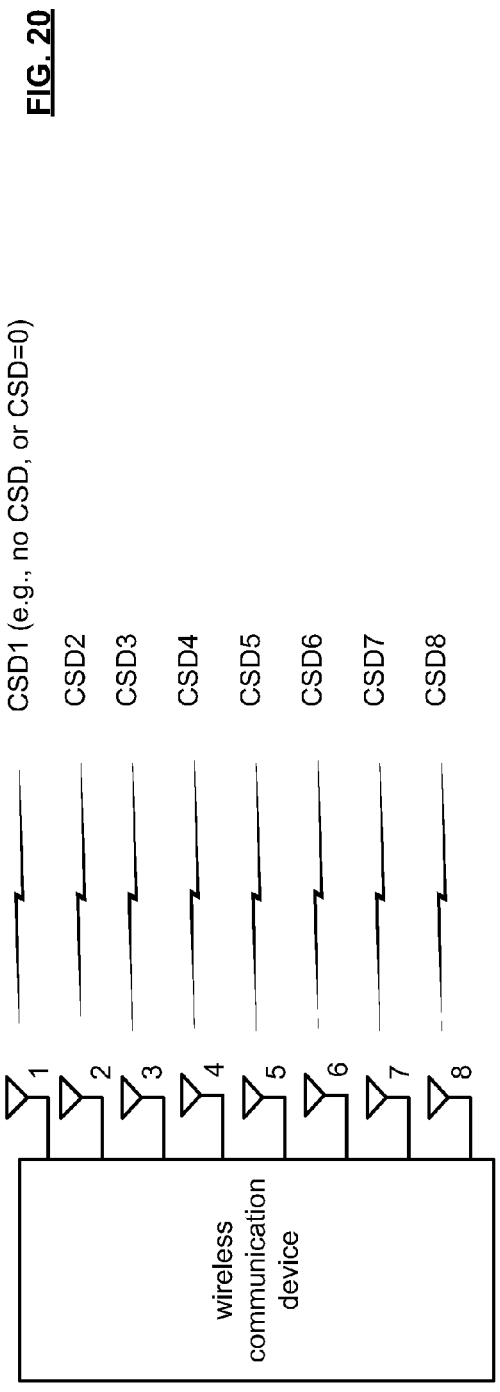
FIG. 20 is a diagram illustrating an embodiment of optimal legacy CSDs that may be employed for communication devices employing eight (8) antennae operating in accordance with a communication protocol (e.g., IEEE 802.11ac).

FIG. 20 is a diagram illustrating an embodiment of optimal legacy CSDs that may be employed for communication devices employing eight (8) antennae operating in accordance with a communication protocol (e.g., IEEE 802.11ac). Using the design constraint of a 95 percentile of the absolute power difference between L-STF and VHT-STF for the IEEE 802.11n channels provides the CSDs respectively shown in the diagram within a wireless communication device that operates using eight (8) antennae.

FIG. 21A is a diagram illustrating an embodiment of an optimal legacy CSD table that may be employed for communication devices employing anywhere from one (1) to eight (8) antennae and operating in accordance with a communication protocol (e.g., IEEE 802.11x where x is a, b, g, n; IEEE 802.11ac; etc.). For the CSD entries corresponding to the embodiment employing seven (7) antennae, this embodiment uses the very bottom option of CSDs from FIG. 19 (which is not the most optimal CSD for the NTX=7 embodiment), as those CSD values provide for some commonality with respect to other most optimal CSDs for embodiments employing other numbers of antennae (e.g., NTX=5, 6, and 8).

FIG. 21B is a diagram illustrating an alternative embodiment of an optimal legacy CSD table that may be employed for communication devices employing anywhere from one (1) to eight (8) antennae and operating in accordance with a communication protocol (e.g., IEEE 802.11x where x is a, b, g, n; IEEE 802.11ac; etc.). This embodiment uses the most optimal CSD entries for each of the embodiments employing the various numbers of antennae (e.g., NTX=5, 6, 7, and 8). However, as can be seen, the seventh row (i.e., second from bottom row) includes the most optimal CSD for the NTX=7 embodiment. This may introduce some minor degree of increased complexity in implementation, in that, there is not the same commonality between the bottom 4 rows of this legacy CSD table. However, such minor increase in complexity, while perhaps adding some minor increase is Silicon die area and/or increase in logic complexity, those minor increases may be acceptable in many applications and contexts. Particularly in embodiments in which the legacy CSD table is implemented as a look up table (LUT), there is negligible (if any) increase in complexity.

As may be understood, the design of a legacy CSD (e.g., CSD to be applied for the legacy portion of a preamble) allows for operating the various antennae of a wireless communication device for very high throughput (VHT) operation in accordance with various standards and/or recommendations of the IEEE 802.11x (where x=a, b, g, n, etc.). For example, the IEEE 802.11n defines the use of a legacy CSD for a wireless communication device that operates using up to 4 transmit (TX) antennae. For wireless communication devices that operate in accordance with IEEE-VHT, a legacy CSD, as designed and constructed in accordance with the principles presented herein, as may be extended generally up to any number of TX antennae (e.g., embodiments including up to 8 TX antennae are explicitly described herein).

A well designed legacy CSD should provide for a number of parameters, including enabling an accurate AGC power setting (e.g., to minimize the AGC error between the a first (e.g., legacy) preamble portion and a second (e.g., VHT) preamble portion so that any extra receiver back off or effective analog to digital converter (ADC) bits can be reduced) within a wireless communication device.

Using other or additional optimization criteria, a well designed legacy CSD should provide for a number of parameters, including enabling an accurate AGC power setting (e.g., (1) to minimize the AGC error between the a first (e.g., legacy) preamble portion and a second (e.g., VHT) preamble portion so that any extra receiver back off or effective analog to digital converter (ADC) bits can be reduced and also (2) to minimize the power fluctuation of the post AGC signal) within a wireless communication device. As may be seen, more than one optimization criterion may be employed in certain embodiments. Such an embodiment may re-use the IEEE 802.11n legacy CSD for embodiments in which anywhere between 1 and 4 transmit antennae are employed (i.e., NTX≤4) within a wireless communication device, and may also use these multiple optimization criteria to select an appropriate legacy CSD for wireless communication devices employing antennae for number greater than 5 (e.g., 5, 6, 7, 8, etc.).

Figure 22:
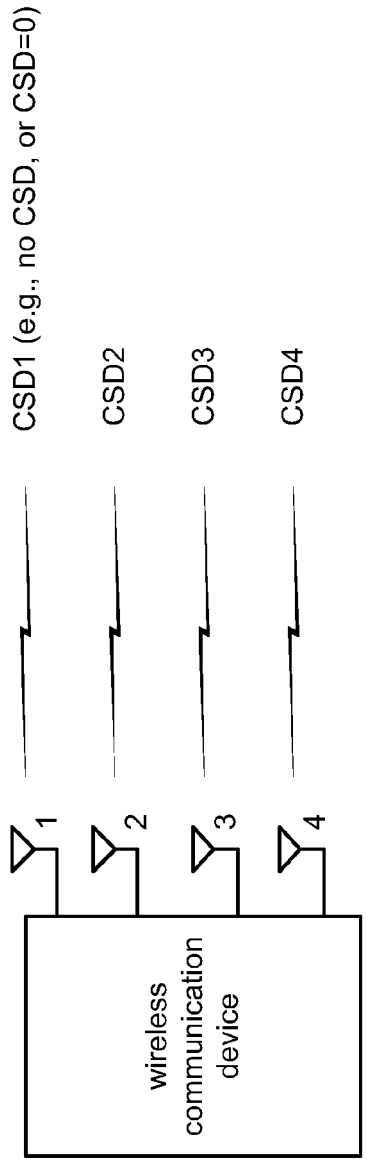
FIG. 22 is a diagram illustrating another embodiment of legacy cyclic shift delay (CSD) that may be employed for communication devices operating in accordance with IEEE 802.11n having and using between 1 and 4 antennae, inclusive.

FIG. 22 is a diagram illustrating another embodiment of legacy cyclic shift delay (CSD) that may be employed for communication devices operating in accordance with IEEE 802.11n having and using between 1 and 4 antennae, inclusive. This diagram shows the CSD values (i.e., in a CSD table) as may be employed by a wireless communication device for effectuating CSD of the legacy preamble portion of a packet or signal when the wireless communication device has and uses anywhere from 1 and 4 antennae, inclusive (i.e., NTX=1, 2, 3, or 4).

In this embodiment, it is again proposed to re-use the IEEE 802.11n legacy CSD for embodiments in which anywhere between 1 and 4 transmit antennae are employed (i.e., NTX≤4) within a wireless communication device.

In the third column of this diagram, a 95 percentile of the AGC error of the legacy preamble is shown using the IEEE 802.11n/B/C/D/E channel model. The respective performance for each of the various embodiments of channel bandwidth of 20 MHz, 40 MHz, and 80 MHz are shown in the diagram in accordance with this 95 percentile of the AGC error of the legacy preamble.

A 95 percentile of the absolute power difference between L-STF and VHT-STF for the IEEE 802.11n channels provides the CSDs respectively shown in the diagram.

In an embodiment employing other or additional optimization criteria employed herein for the design and construction of legacy CSD, the CSDs are designed in accordance with the constraint as being multiples of 25 ns. Each respective CSD value is selected in accordance with the constraint of being within the range of [−200 ns 0 ns].

The optimization criteria may also include minimizing the AGC error span of the legacy preamble (i.e., from 2.5% to 97.5% being 95 percentile of the AGC error of the legacy preamble) of the AGC error cumulative distribution function (CDF) of the IEEE 802.11n/B/C/D/E channel model.

In order to capture the random initial phase offset of the transmit (TX) chain, the following two (2) cases are considered: (1) 0 deg phase shift between even and odd TX antennas, and (2) 180 deg phase shift between even and odd TX antennas.

Figure 23:
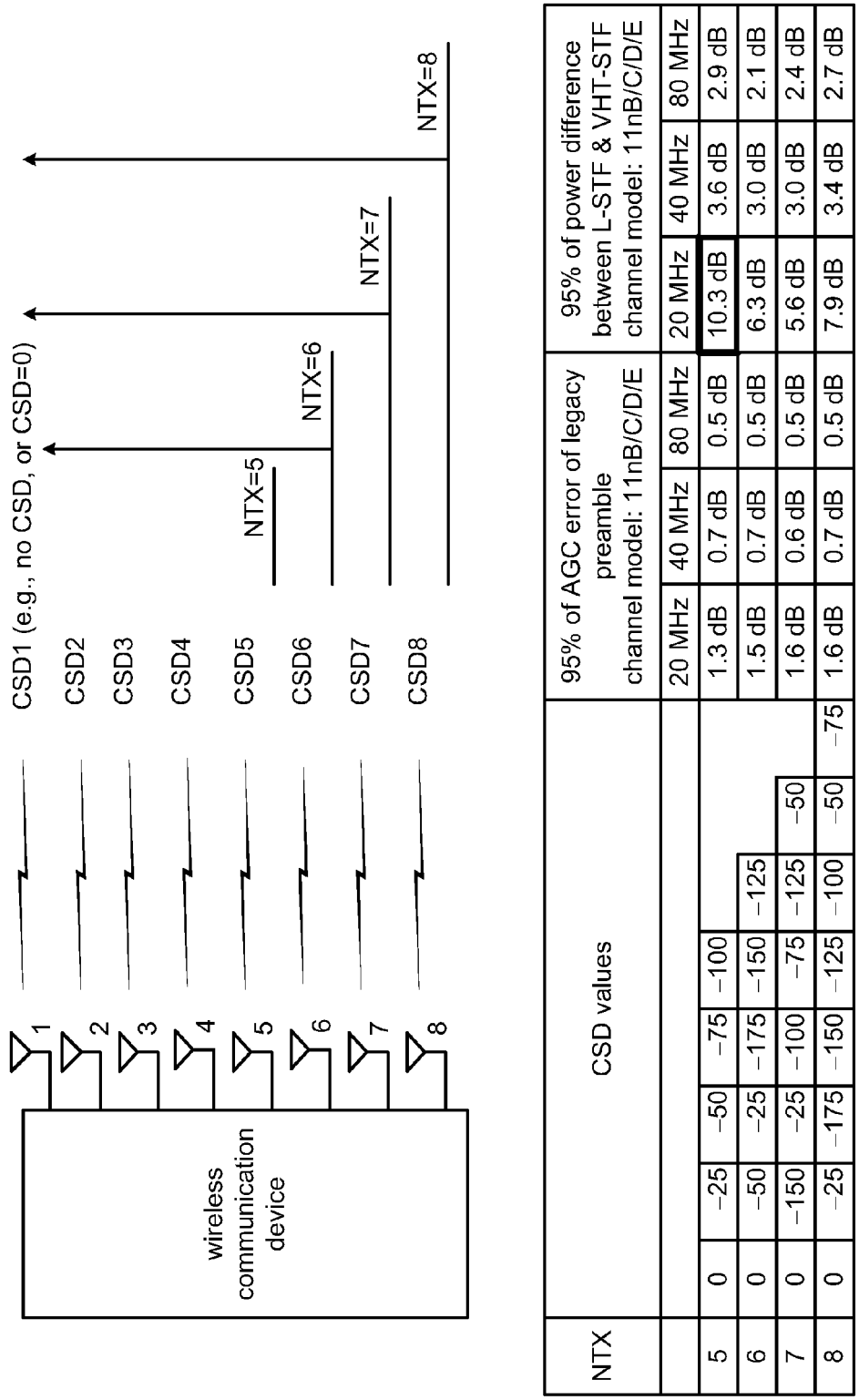
FIG. 23 is a diagram illustrating an embodiment of optimal legacy CSDs that may be employed for communication devices employing various numbers of antennae including five (5), six (6), seven (7), and eight (8) antennae operating in accordance with a communication protocol (e.g., IEEE 802.11ac).

FIG. 23 is a diagram illustrating an embodiment of optimal legacy CSDs that may be employed for communication devices employing various numbers of antennae including five (5), six (6), seven (7), and eight (8) antennae operating in accordance with a communication protocol (e.g., IEEE 802.11ac).

Certain observations may be made with respect to the resultant optimized legacy CSD when using the above-referenced optimization criteria. For example, the AGC error of the legacy preamble is usually small. It is also noted that optimal CSD combinations are not unique. In other words, there are more than one CSD combinations that can provide close to optimal performance in terms of minimizing the legacy AGC error. One respective optimal CSD combination is presented within the diagram for each of the antennae embodiments including 5, 6, 7, and 8 antennae.

However, as can be seen in the fourth column of the table at the bottom of the diagram, the power difference between a first portion of the packet (L-STF) and a second portion of the packet (VHT-STF) could be undesirably large. For example, considering the operation at 20 MHz, the 95 percentile of the absolute power difference between L-STF and VHT-STF for the IEEE 802.11n/B/C/D/E channel model can be somewhat large (e.g., 10.3 dB).

Further Optimization of Legacy CSD

Slightly modified optimization criteria may be employed in an effort to address this potentially undesirable situation (e.g., power difference between a first portion of the packet (L-STF) and a second portion of the packet (VHT-STF) being undesirably large) in yet another embodiment.

In an embodiment employing these alternative optimization criteria for the design and construction of legacy CSD, the CSDs are designed in accordance with the constraint as being multiples of 25 ns. Each respective CSD value is selected in accordance with the constraint of being within the range of [−200 ns 0 ns].

In addition, this alternative embodiment may consider only a subset of all possible CSD combinations meeting the criteria above, and particularly those CSD combinations having an AGC error span of the legacy preamble that is no greater than 0.1 dB of the optimal CSD combination (e.g., in accordance with the constraints of the previous embodiment corresponding to FIG. 23). For example, the AGC error span of the legacy preamble may be viewed as being the power difference (on the receiver side) between L-STF and the 3 fields (L-LTF, L-SIG, and VHT-SIGA), considered together.

The optimization criteria may also include minimizing the AGC error span of the legacy preamble (i.e., from 2.5% to 97.5% being 95 percentile of the AGC error of the legacy preamble) of the AGC error cumulative distribution function (CDF) of the IEEE 802.11n/B/C/D/E channel model.

In addition to the minimizing the AGC error span of the legacy preamble, the optimization criteria of this embodiment may also include minimizing the 95 percentile of the absolute power difference (i.e., from 2.5% to 97.5% being 95 percentile of the power difference) between a first portion of the packet (L-STF) and a second portion of the packet (VHT-STF) for the IEEE 802.11n/B/C/D/E channel model.

As with respect to other embodiments, in order to capture the random initial phase offset of the transmit (TX) chain, the following two (2) cases are considered: (1) 0 deg phase shift between even and odd TX antennas, and (2) 180 deg phase shift between even and odd TX antennas.

Figure 24:
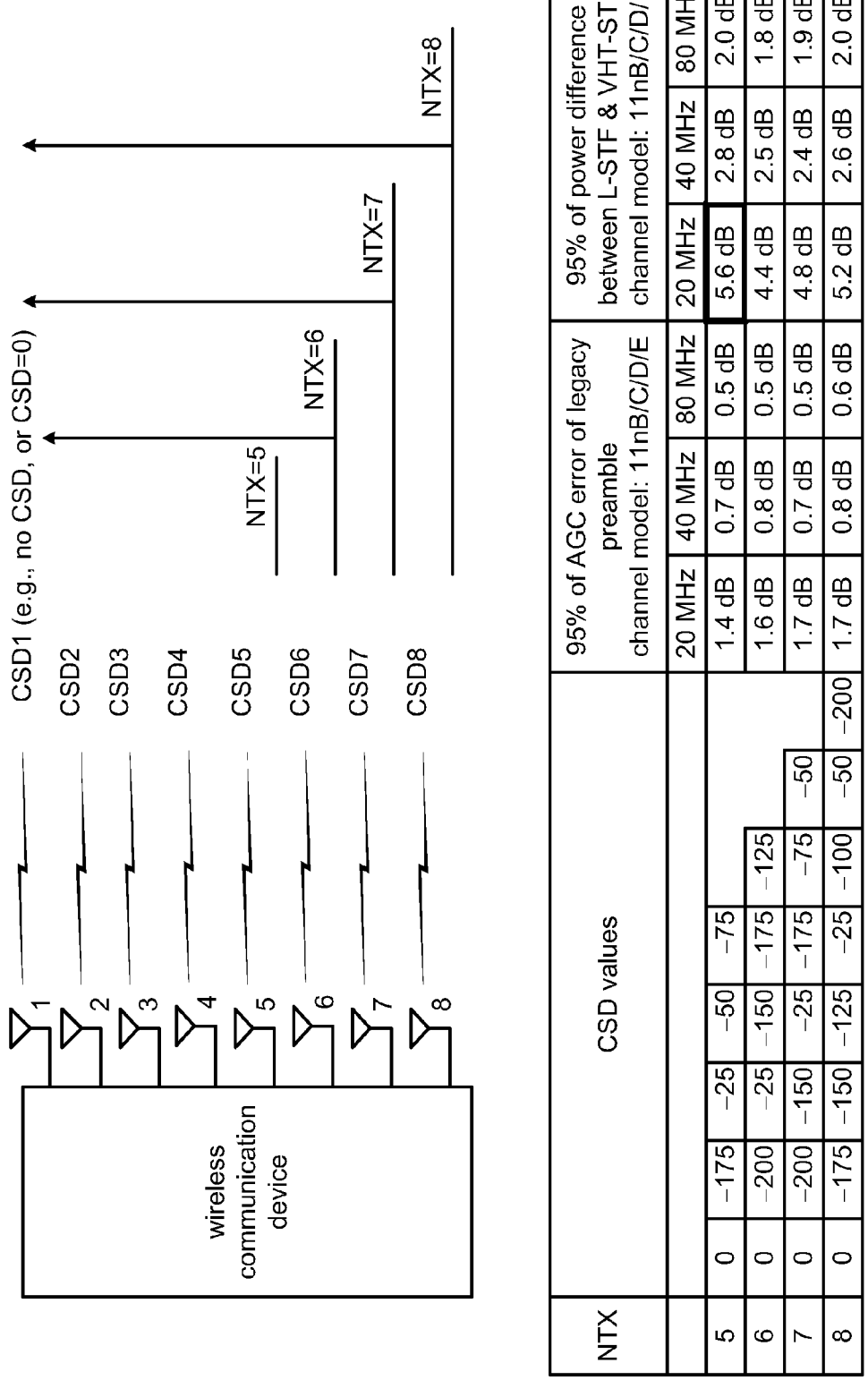
FIG. 24 is a diagram illustrating an alternative embodiment of optimal legacy CSDs that may be employed for communication devices employing various numbers of antennae including five (5), six (6), seven (7), and eight (8) antennae operating in accordance with a communication protocol (e.g., IEEE 802.11ac).

FIG. 24 is a diagram illustrating an alternative embodiment of optimal legacy CSDs that may be employed for communication devices employing various numbers of antennae including five (5), six (6), seven (7), and eight (8) antennae operating in accordance with a communication protocol (e.g., IEEE 802.11ac).

Certain observations may be made with respect to the resultant optimized legacy CSD when using the above-referenced optimization criteria (e.g., that also includes, among other optimization criteria, minimizing the 95 percentile of the absolute power difference between L-STF and VHT-STF). For example, the AGC error of the legacy preamble is again usually small.

It is again also noted that optimal CSD combinations are not unique. In other words, there are more than one CSD combinations that can provide close to optimal performance in terms of minimizing the legacy AGC error. One respective optimal CSD combination is presented within the diagram for each of the antennae embodiments including 5, 6, 7, and 8 antennae.

Comparing this FIG. 24 with FIG. 25, as can be seen in the fourth column of the table at the bottom of FIG. 25, the power difference between a first portion of the packet (L-STF) and a second portion of the packet (VHT-STF) is significantly less in FIG. 25 when compared to FIG. 24. For example, considering the operation at 20 MHz, the 95 percentile of the absolute power difference between L-STF and VHT-STF for the IEEE 802.11n/B/C/D/E channel model in FIG. 24 is only 5.6 dB (compared to 10.3 dB of FIG. 23).

FIG. 25 is a diagram illustrating an alternative embodiment of an optimal legacy CSD table that may be employed for communication devices employing anywhere from one (1) to eight (8) antennae and operating in accordance with a communication protocol (e.g., IEEE 802.11x where x is a, b, g, n; IEEE 802.11ac; etc.). This embodiment uses the most optimal CSD entries for each of the embodiments employing the various numbers of antennae (e.g., NTX=5, 6, 7, and 8) using the further refined optimization criteria presented above (e.g., that also includes, among other optimization criteria, minimizing the 95 percentile of the absolute power difference between L-STF and VHT-STF while also minimizing the AGC error span of the legacy preamble).

FIG. 26A, FIG. 26B, and FIG. 26C are diagrams illustrating various embodiments of applying CSDs to respective portions of a packet thereby minimizing power error differences between various portions thereof.

Referring to FIG. 26A, as can be seen, a packet may be viewed as being divided into various portions. Appropriately selected CSDs may be applied to the packet (or selectively to one or more particular portions thereof) to ensure that power differences between various portions are minimized. In one embodiment, to allow for accurate automatic gain control (AGC) settings (e.g., such as within a receiving wireless communication device that receives a signal generated in accordance with such CSDs), such CSDs as designed in accordance with the principles and aspects of the invention as presented herein, power differences are effectively minimized between various portions of the packet. In other words, there is not a significant difference in power when comparing two or more portions of the packet. With respect to FIG. 26A, the CSDs are applied to various portions of the packet (or consistently across the entire packet or frame) to ensure the minimization of power differences among respective portions thereof.

Referring to FIG. 26B, a packet may be viewed as being composed of a preamble and a payload (e.g., a data portion). The preamble may include a legacy portion (e.g., such as in accordance with various standards and/or recommendations of the IEEE 802.11x (where x=a, b, g, n, etc.) and also a VHT portion (e.g., such as in accordance with IEEE 802.11ac and very high throughput (VHT)). As with respect to other embodiments, appropriately selected CSDs may be applied to portions of the packet (or selectively to one or more particular portions thereof) to ensure that power differences between various portions are minimized. In this embodiment, to allow for accurate automatic gain control (AGC) settings (e.g., such as within a receiving wireless communication device that receives a signal generated in accordance with such CSDs), such CSDs as applied to the legacy portion of the preamble and the VHT portion of the preamble so that power differences are effectively minimized between various portions of the packet (e.g., between the legacy preamble portion power and the VHT preamble portion power). In other words, there is not a significant difference in power when comparing such portions of the packet (e.g., the legacy portion and the VHT portion). With respect to FIG. 26B, the CSDs are applied to various portions of the packet (or consistently across the entire packet or frame) to ensure the minimization of power differences among respective portions thereof.

Referring to FIG. 26C, a packet may be viewed as being composed of a preamble and a payload (e.g., a data portion). The preamble includes a legacy short training field (L-STF), a legacy long training field (L-LTF), a legacy signal field (L-SIG), at least one (e.g., a first) very high throughput signal field (VHT-SIGA), a very high throughput short training field (VHT-STF), at least one very high throughput long training field (VHT-LTF), a second very high throughput signal field (VHT-SIGB), followed by a data field (VHT DATA).

In this embodiment, to allow for accurate automatic gain control (AGC) settings (e.g., such as within a receiving wireless communication device that receives a signal generated in accordance with such CSDs), such CSD is applied to desired portions of the signal (e.g., the L-STF field, the L-LTF field, the L-SIG field, and the VHT-SIGA field) so that power differences are effectively minimized between the L-STF field and the VHT-STF field. In other words, there is not a significant difference in power when comparing such portions of the packet (e.g., the L-STF field and the VHT-STF field). With respect to FIG. 26C, the CSDs are applied to various portions of the packet (or consistently across the entire packet or frame) to ensure the minimization of power differences among respective portions thereof.

Moreover, the power difference minimization between the L-STF field and the VHT-STF field may also be made with respect to an optimization constraint that the power difference between the L-STF field and the 3 fields (L-LTF, L-SIG, and VHT-SIGA), considered together, is also minimized within some acceptable range. For example, the optimization criteria may also include minimizing the AGC error span of the legacy preamble (i.e., from 2.5% to 97.5% being 95 percentile of the AGC error of the legacy preamble) of the AGC error cumulative distribution function (CDF) of the IEEE 802.11n/B/C/D/E channel model. That is to say, while meeting the optimization constraint that the power difference between the L-STF field and the 3 fields (L-LTF, L-SIG, and VHT-SIGA), is minimized within some acceptable range, appropriately selected CSDs are employed so that power differences between the L-STF field and the VHT-STF field are also effectively minimized.

From another perspective, the appropriately CSDs are selected in accordance with the optimization constraint of minimizing the post-AGC power difference between the legacy preamble and the HT/VHT preamble under the constraint that the AGC error of the legacy preamble is not larger than a certain threshold, where the AGC error of legacy preamble is defined as the power difference between the post AGC L-STF and L-LTF/L-SIG/VHT-SIGA.

FIG. 27A, FIG. 27B, FIG. 28A, and FIG. 28B illustrate various embodiments of methods for operating wireless communication devices.

Referring to method 2700 of FIG. 27A, the method 2700 begins by generating a packet in accordance with a plurality of CSDs, such that each of the plurality of CSDs being a respective integer multiple of a time period, for minimizing difference between a first power associated with a first portion of the packet and a second power associated with a second portion of the packet, as shown in a block 2710. In certain embodiments, such operations of this block may be viewed as being performed within a baseband processing module (e.g., such as in accordance with the baseband processing module as described with reference to FIG. 2). In this embodiment, as within others herein, it is noted that various processing of the packet may be performed to generate a signal compliant for transmission from a wireless communication device (e.g., to generate a signal, such as a continuous-time signal, appropriate to be transmitted over the air from one wireless communication device to at least one other wireless communication device).

Via a plurality of antennae, the method 2700 continues by transmitting a signal including the packet to a plurality of wireless communication devices such that each of the plurality of antennae transmitting at a respective time in accordance a respective one of the plurality of CSDs, as shown in a block 2720.

Generally speaking, such operations in accordance with the method 2700 may be viewed as being performed within a transmitting wireless communication device (e.g., such as an access point (AP) or a wireless station (STA) operative to transmit signals within a wireless communication system).

Referring to method 2701 of FIG. 27B, the method 2701 begins by generating a multi-user packet including a first portion being compliant in accordance with a first communication protocol and a second portion being compliant in accordance with a second communication protocol in accordance with a plurality of CSDs, each of the plurality of CSDs being a respective integer multiple of a time period, for minimizing difference between a first power associated with the first portion and the second power associated with the second portion, as shown in a block 2711.

In certain embodiments, such operations of this block may be viewed as being performed within a baseband processing module (e.g., such as in accordance with the baseband processing module as described with reference to FIG. 2). Also, in certain embodiments, the first portion of the multi-user packet may be viewed as being an L-STF, and the second portion of the multi-user packet may be viewed as being an VHT-STF (e.g., such as in accordance with FIG. 26C or others described herein), as shown in a block 2711a.

Via a plurality of antennae, the method 2701 then operates by transmitting a signal including the multi-user packet to a plurality of wireless communication devices such that each of the plurality of antennae transmitting at a respective time in accordance a respective one of the plurality of CSDs, as shown in a block 2721.

Generally speaking, such operations in accordance with the method 2701 may be viewed as being performed within a transmitting wireless communication device (e.g., such as an access point (AP) or a wireless station (STA) operative to transmit signals within a wireless communication system).

Figure 28B:
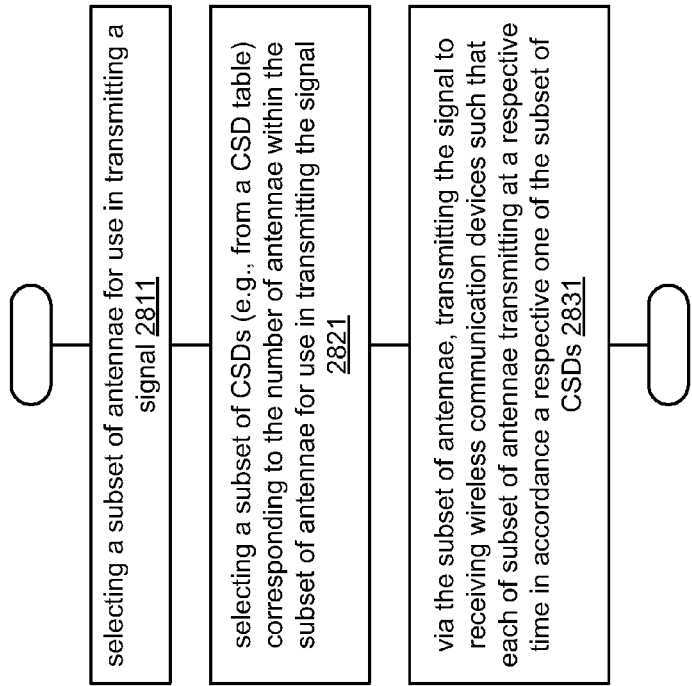
Figure 28A:
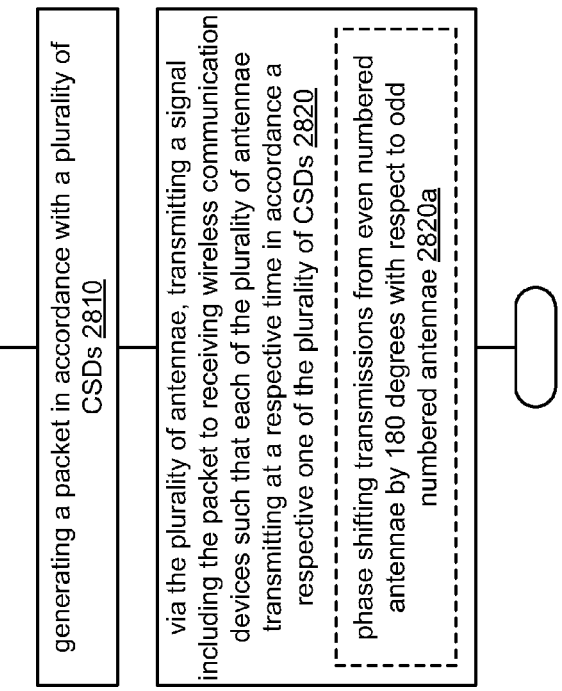

Referring to method 2800 of FIG. 28A, the method 2800 begins by generating a packet in accordance with a plurality of CSDs, as shown in a block 2810. Via the plurality of antennae, the method 2800 then operates by transmitting a signal including the packet to receiving wireless communication devices such that each of the plurality of antennae transmitting at a respective time in accordance a respective one of the plurality of CSDs, as shown in a block 2820.

In certain embodiments, the method 2800 continues by phase shifting transmissions from even numbered antennae by 180 degrees with respect to odd numbered antenna, as shown in a block 2820a. Generally speaking, such operations in accordance with the method 2800 may be viewed as being performed within a transmitting wireless communication device (e.g., such as an access point (AP) or a wireless station (STA) operative to transmit signals within a wireless communication system).

Referring to method 2801 of FIG. 28B, the method 2801 begins by selecting a subset of antennae for use in transmitting a signal, as shown in a block 2811. The method 2801 then operates by selecting a subset of CSDs (e.g., from a CSD table) corresponding to the number of antennae within the subset of antennae for use in transmitting the signal, as shown in a block 2821.

Via the subset of antennae, the method 2801 continues by transmitting the signal to receiving wireless communication devices such that each of subset of antennae transmitting at a respective time in accordance a respective one of the subset of CSDs, as shown in a block 2831.

Generally speaking, such operations in accordance with the method 2801 may be viewed as being performed within a transmitting wireless communication device (e.g., such as an access point (AP) or a wireless station (STA) operative to transmit signals within a wireless communication system).

It is also noted that the various operations and functions as described with respect to various methods herein may be performed within a wireless communication device, such as using a baseband processing module implemented therein (e.g., such as in accordance with the baseband processing module as described with reference to FIG. 2) and/or other components therein. For example, such a baseband processing module can perform generation of a packet or frame in accordance with appropriately selected CSDs, as well as generation of a signal including such a packet and transmission of that signal using at least one of any number of antennae of a wireless communication device in accordance with various aspects of the invention, and/or any other operations and functions as described herein, etc. or their respective equivalents.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for operating a wireless communication device, the method comprising:
generating a multi-user packet including a first portion being compliant with a first communication protocol and a second portion being compliant with a second communication protocol in accordance with a plurality of Cyclic Shift Delays (CSDs), each of the plurality of CSDs being a respective integer multiple of a time period, for minimizing difference between a first transmit power associated with the first portion and a second transmit power associated with the second portion; and
via a plurality of antennae, transmitting a signal including the multi-user packet to a plurality of wireless communication devices such that each of the plurality of antennae transmitting at a respective time in accordance with a respective one of the plurality of CSDs.

2. The method of claim 1, wherein:
the plurality of CSDs also minimizing difference between the first transmit power associated with the first portion and a third transmit power associated with a third portion of the multi-user packet being compliant in accordance with the first communication protocol.

3. The method of claim 2, wherein:
the first portion corresponding to a legacy short training field (L-STF); and
the third portion corresponding to a legacy long training field (L-LTF), a legacy signal field (L-SIG), and a very high throughput signal field (VHT-SIGA).

4. The method of claim 1, wherein:
the first portion of the multi-user packet being intended for a first of the plurality of wireless communication devices; and
the second portion of the multi-user packet being intended for a second of the plurality of wireless communication devices.

5. The method of claim 1, wherein:
the second communication protocol being a legacy communication protocol relative to the first communication protocol;
a first subset of the plurality of CSDs corresponding to the first communication protocol; and
a second subset of the plurality of CSDs corresponding to the second communication protocol.

6. The method of claim 1, further comprising:
generating the multi-user packet in accordance with a first subset of the plurality of CSDs when the plurality of antennae transmitting the signal using a first subset of the plurality of antennae; and
generating the multi-user packet in accordance with a second subset of the plurality of CSDs when the plurality of antennae transmitting the signal using a second subset of the plurality of antennae.

7. The method of claim 1, wherein:
the first portion being a legacy short training field (L-STF); and
the second portion being a very high throughput short training field (VHT-STF).

8. The method of claim 1, wherein:
the time period being 25 nano-seconds; and
each of plurality of CSDs being in a range of 0 nano-seconds to 200 nano-seconds, inclusive.

9. The method of claim 1, wherein:
the plurality of antennae including even numbered antennae and odd numbered antennae; and further comprising:
phase shifting transmissions from the even numbered antennae by 180 degrees with respect to transmissions from the odd numbered antennae.

10. The method of claim 1, wherein:
the wireless communication device being an access point (AP); and
the plurality of wireless communication devices being a plurality of wireless stations (STAs).

11. An apparatus, comprising:
a baseband processing module to generate a multi-user packet including a first portion being compliant with a first communication protocol and a second portion being compliant in accordance with a second communication protocol in accordance with a plurality of Cyclic Shift Delays (CSDs) for minimizing difference between a first transmit power associated with the first portion and a second transmit power associated with the second portion; and
a plurality of antennae to transmit a signal including the multi-user packet to a plurality of wireless communication devices; and wherein:
each of the plurality of CSDs being a respective integer multiple of a time period; and
each of the plurality of antennae to transmit at a respective time in accordance a respective one of the plurality of CSDs.

12. The apparatus of claim 11, wherein:
the plurality of CSDs also to minimize difference between the first transmit power associated with the first portion and a third transmit power associated with a third portion of the multi-user packet being compliant in accordance with the first communication protocol.

13. The apparatus of claim 12, wherein:
the first portion corresponding to a legacy short training field (L-STF); and
the third portion corresponding to a legacy long training field (L-LTF), a legacy signal field (L-SIG), and a very high throughput signal field (VHT-SIGA).

14. The apparatus of claim 11, wherein:
the first portion of the multi-user packet being intended for a first of the plurality of wireless communication devices; and
the second portion of the multi-user packet being intended for a second of the plurality of wireless communication devices.

15. The apparatus of claim 11, wherein:
the second communication protocol being a legacy communication protocol relative to the first communication protocol;
a first subset of the plurality of CSDs corresponding to the first communication protocol; and
a second subset of the plurality of CSDs corresponding to the second communication protocol.

16. The apparatus of claim 11, wherein:
the baseband processing module to generate the multi-user packet in accordance with a first subset of the plurality of CSDs when the plurality of antennae transmitting the signal using a first subset of the plurality of antennae; and
the baseband processing module to generate the multi-user packet in accordance with a second subset of the plurality of CSDs when the plurality of antennae transmitting the signal using a second subset of the plurality of antennae.

17. The apparatus of claim 11, wherein:
the first portion being a legacy short training field (L-STF); and
the second portion being a very high throughput short training field (VHT-STF).

18. The apparatus of claim 11, wherein:
the time period being 25 nano-seconds; and
each of plurality of CSDs being in a range of 0 nano-seconds to 200 nano-seconds, inclusive.

19. The apparatus of claim 11, wherein:
the plurality of antennae including even numbered antennae and odd numbered antennae; and
transmissions from the even numbered antennae being phase shifted by 180 degrees with respect to transmissions from the odd numbered antennae.

20. The apparatus of claim 11, wherein:
the apparatus being an access point (AP); and
the plurality of wireless communication devices being a plurality of wireless stations (STAs).

21. An apparatus, comprising:
a baseband processing module to generate a multi-user packet including a legacy short training field (L-STF) being compliant in accordance with a first communication protocol and a very high throughput short training field (VHT-STF) being compliant in accordance with a second communication protocol in accordance with a plurality of Cyclic Shift Delays (CSDs) for minimizing difference between a first transmit power associated with the L-STF and the VHT-STF associated with the second portion and also for minimizing difference between the first transmit power associated with the L-STF and a second transmit power associated with a legacy long training field (L-LTF), a legacy signal field (L-SIG), and a very high throughput signal field (VHT-SIGA); and
a plurality of antennae to transmit a signal including the multi-user packet to a plurality of wireless communication devices; and wherein:

each of the plurality of CSDs being a respective integer multiple of 25 nano-seconds;

each of the plurality of antennae to transmit at a respective time in accordance a respective one of the plurality of CSDs; and each of plurality of CSDs being in a range of 0 nano-seconds to 200 nano-seconds, inclusive.

22. The apparatus of claim 21, wherein:

the second communication protocol being a legacy communication protocol relative to the first communication protocol;

a first subset of the plurality of CSDs corresponding to the first communication protocol; and a second subset of the plurality of CSDs corresponding to the second communication protocol.

23. The apparatus of claim 21, wherein:

the baseband processing module generating the multi-user packet in accordance with a first subset of the plurality of CSDs when the plurality of antennae transmitting the signal using a first subset of the plurality of antennae; and the baseband processing module generating the multi-user packet in accordance with a second subset of the plurality of CSDs when the plurality of antennae transmitting the signal using a second subset of the plurality of antennae.

24. The apparatus of claim 21, wherein:

the apparatus being an access point (AP); and the plurality of wireless communication devices being a plurality of wireless stations (STAs).

* * * * *

UNITED STATES PATENT AND TRADEMARK OFFICE
CERTIFICATE OF CORRECTION

PATENT NO. : 8,619,676 B2  Page 1 of 1
APPLICATION NO. : 13/073775
DATED : December 31, 2013
INVENTOR(S) : Jun Zheng et al.

It is certified that error appears in the above-identified patent and that said Letters Patent is hereby corrected as shown below:

In the Claims:

Col. 39, line 57, in claim 11: after "in accordance" insert --with--
Col. 41, line 4, in claim 21: after "in accordance" insert --with--

Signed and Sealed this
Sixteenth Day of September, 2014

Michelle K. Lee
*Deputy Director of the United States Patent and Trademark Office*